(12) United States Patent
Tanaka et al.

(10) Patent No.: US 6,971,468 B2
(45) Date of Patent: Dec. 6, 2005

(54) ANTITHEFT APPARATUS AND ANTITHEFT SYSTEM

(75) Inventors: Shinichi Tanaka, Kobe (JP); Mitsuhiko Tanaka, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 118 days.

(21) Appl. No.: 10/349,068

(22) Filed: Jan. 23, 2003

(65) Prior Publication Data

US 2003/0156017 A1 Aug. 21, 2003

(30) Foreign Application Priority Data

Jan. 23, 2002 (JP) ............................ 2002-014763

(51) Int. Cl.⁷ ..................... B60R 25/00; B60R 25/10
(52) U.S. Cl. ............. 180/287; 340/426.2; 340/426.24; 340/430; 701/45
(58) Field of Search ................ 180/287, 273, 180/286; 280/735; 340/426.17, 426.2, 426.22, 340/426.24, 426.25, 426.26, 426.28, 430; 701/45, 49

(56) References Cited

U.S. PATENT DOCUMENTS

| 4,997,053 A | * | 3/1991 | Drori et al. ................. 180/287 |
| 5,277,043 A |   | 1/1994 | Inashvili |
| 5,811,886 A | * | 9/1998 | Majmudar ................... 180/287 |

FOREIGN PATENT DOCUMENTS

| CH | 669763 A   | * | 4/1989  | ........... B60R 25/00 |
| FR | 2537070 A  | * | 6/1984  | ............ A62C 3/06 |
| FR | 2553356 A1 | * | 4/1985  | ............ A62C 3/06 |
| FR | 2733194 A1 | * | 10/1996 | ........... B60R 25/10 |
| FR | 2743920 A1 | * | 7/1997  | ........... G08B 15/02 |

* cited by examiner

Primary Examiner—Peter C. English
(74) Attorney, Agent, or Firm—Oliff & Berridge, PLC

(57) ABSTRACT

An antitheft apparatus, which is installed in a vehicle having an expandable body system to expand expandable body that confine a motion of a burglar in predetermined space portions in a compartment, ejects material as a source of foam polystyrene into the compartment and then injects a steam to the material to confine the motion of the intruder by the foam polystyrene when a presence of the intruder in the compartment is sensed.

13 Claims, 30 Drawing Sheets

ANTITHEFT APPARATUS AND ANTITHEFT SYSTEM

The present disclosure relates to the subject matter contained in Japanese Patent Application No. 2002-14763 filed on Jan. 23, 2002 and Japanese Patent Application No. 2001-113490 filed on Apr. 12, 2001, which are incorporated herein by reference in its entirety.

BACKGROUND OF THE INVENTION

1. Field of the Invention

The invention relates to an antitheft apparatus and an antitheft system and, more particularly, an antitheft apparatus and an antitheft system for preventing a burglary of a vehicle, electric parts installed into the vehicle, money and articles, which are left in the vehicle, etc.

2. Description of the Related Art

Both number of occurrence and occurring rate of cases of robbery such as vehicle burglary, vehicle robbery tends to increase and become a social problem. Therefore, various antitheft systems for preventing the vehicle robbery has been proposed in recent years. For example, there is such a system that sounds an alarm such as a siren or lights a lamp when the door lock of the vehicle is destroyed or the window glass such as front window glass, rear window glass, or side window glass is broken.

In this manner, since the alarm is sounded or the lamp is lighted, it is possible to inform those around the vehicle that the vehicle robbery is taking place. Therefore, it is expected that the damage can be suppressed to the minimum.

However, if no person is present around the vehicle or if the vehicle burglar does not care a bit that the alarm is being sounded or the lamp is being lighted, there is a high possibility that electric parts installed into the vehicle, or money and articles that, which are left in the vehicle, are stolen, even though the robbery of the vehicle its self can be prevented.

As one of means for solving such problem, it has been proposed to make any attack to a person who is going to commit the vehicle robbery to thus prevent a larcenous act. However, since the level of the vehicle robbery extends from a very vicious case to a minor offense case, it is possible to cause any trouble in some cases if the same attack is uniformly made to a person who is going to commit the theft. Also, there is such a possibility that the excessive attack stimulates the person on the contrary.

SUMMARY OF THE INVENTION

The invention has been made in light of the above problems. It is an object of the invention to provide an antitheft apparatus and an antitheft system capable of capturing a person who is going to commit a vehicle robbery and repelling such person from the vehicle to achieve improvement of security performance about a vehicle, electric parts installed into the vehicle, money and articles that are left in the vehicle, etc.

In order to attain the above object, an antitheft apparatus (1) according to the invention includes an expandable body system, an intruder detection unit, and a first controlling unit. The expandable body system expands an expandable body in a predetermined space in the vehicle. The intruder detection unit detects an intruder into the vehicle. The first controlling unit controls a driving unit of the expandable body system to expand the expandable body when the intruder detection unit detects that an intruder is present in the vehicle.

Also, in an antitheft apparatus (2) according to the invention, in addition to the above antitheft apparatus (1), the intruder detection unit detects that a person sits on a seat of the vehicle. The first controlling unit controls the driving unit of the expandable body system to expand the expandable body when a first condition is satisfied and the intruder detection unit detects the sitting.

According to the antitheft apparatus (1) or (2), the antitheft apparatus includes the expandable body system, which expands an expandable body in a predetermined space in the vehicle. When it is detected that the intruder is present in the vehicle, the antitheft apparatus can capture the intruder by expanding the expandable body to confine the motion of the intruder. Therefore, the antitheft apparatus, which is improved in the security performance, can be implemented.

In addition, according to the antitheft apparatus (2), since the expandable body is expanded when not only the presence of the intruder is detected but also the sitting of the intruder on the driver's seat is detected, the motion of the intruder can be confined more surely.

Also, an antitheft apparatus (3) according to the invention includes an expandable body system, a pre-intrusion detection unit, and a second controlling unit. The expandable body system expands an expandable body in a predetermined space in a vehicle. The pre-intrusion detection unit detects a person who is going to intrude into the vehicle. The second controlling unit controls a driving unit of the expandable body system to expand the expandable body when a first predetermined time has been lapsed since the pre-intrusion detection unit detects the person.

According to the above antitheft apparatus (3), the antitheft apparatus includes the expandable body system, which expands an expandable body in a predetermined space in the vehicle. The antitheft apparatus expands the expandable body when the first predetermined time (e.g., a time required until the person who is going to commit the vehicle robbery sits on the driver's seat or the passenger seat after he or she comes close to the vehicle) has been lapsed since the pre-intrusion detection unit detects the person who is going to intrude into the vehicle (i.e. a person who is coming close to the vehicle).

That is, the expandable body is expanded at a time when the person who is going to commit vehicle robbery sits on a driver's seat or a passenger seat to confine the motion of the intruder. Whereby, it becomes possible to capture the intruder. Therefore, the antitheft apparatus, which is improved in the security performance, can be implemented.

By the way, the above antitheft apparatus (1) expands the expandable body when the presence of the intruder in the vehicle is detected. Hence, in order to work normally the security operation of the antitheft apparatus (1), the signal supplied from the sensor, which is installed into the vehicle having the antitheft apparatus to detect the intruder into the vehicle, etc. must be acquired.

However, there is such a possibility that such sensor is destroyed by the intruder who has the skilled technique. Thus, if the sensor is destroyed before the sensor detects the presence of the intrusion, the expandable body cannot be expanded. Thus, such a problem is caused that the motion of the intruder cannot be confined.

In contrast, the above antitheft apparatus (3) is not an antitheft apparatus, which expands the expandable body when the presence of the intruder in the vehicle is detected. The antitheft apparatus (3) expands the expandable body when the first predetermined time (e.g., a time required until the person who is going to commit the vehicle robbery sits on the driver's seat or the passenger seat after he or she comes close to the vehicle) has lapsed after the person who is going to enter into the vehicle (e.g., the person who comes close to the vehicle) is detected.

Therefore, in order to work normally the security operation of the antitheft apparatus (3), merely the signal supplied from the sensor, which is installed into the vehicle having the antitheft apparatus, for detecting the person who comes close to the vehicle may be acquired.

Of course, it is possible that the sensor is destroyed by the intruder who has the skilled technique. However, the sensor detects not the presence of the intruder in the vehicle but the person who comes close to the vehicle (i.e., the person who is going to enter into the vehicle), such a situation is seldom considered that the sensor is destroyed before the sensor detects the corner to the vehicle.

Therefore, even though the sensor is destroyed, the motion of the intruder can be confined by expanding the expandable body.

Also, in the antitheft apparatus (4) according to the invention, in addition to any one of the above antitheft apparatuses (1) to (3), the driving unit of the expandable body system ejects a material serving as a source of foam polystyrene into the vehicle and injects steam to the ejected material.

According to the above antitheft apparatus (4), the driving unit of the expandable body system ejects the material serving as the source of foam polystyrene into the vehicle and injects the steam to the ejected material. Therefore, since the motion of the intruder is confined by the foam polystyrene (polystyrene containing bubbles) when the intruder in the vehicle is detected, the motion of the intruder can be confined not to inflict a serious injury upon even the intruder.

Also, in the antitheft apparatus (5) according to the invention, in addition to any one of the above antitheft apparatuses (1) to (3), the expandable body system is an air bag system.

According to the above antitheft apparatus (5), since the expandable body system is the air bag system, the motion of the intruder can be confined by expanding the air bag when the intruder in the vehicle is detected. Also, because the air bag system is not newly installed into the vehicle to prevent the vehicle robbery, cost reduction can be achieved.

Also, in addition to any one of the above antitheft apparatuses (1) to (5), an antitheft apparatus (6) according to the invention further includes a gas injection system and a third controlling unit. The gas injection system includes a driving unit for injecting gas into the vehicle. The third controlling unit controls the driving unit of the gas injection system to inject the gas into the vehicle when a second predetermined condition is satisfied. The third controlling unit is connected to the driving unit of the gas injection system.

According to the above antitheft apparatus (6), the gas such as steam and cold air can be injected into the vehicle when the second predetermined condition is satisfied (e.g., a certain time has lapsed from a start of expansion of the expandable body) after the condition required to expand the expandable body is satisfied.

Hence, even if expanding the expandable body could not confine the intruder, such intruder can be driven away by injecting the gas.

Also, in addition to any one of the above antitheft apparatuses (1) to (6), an antitheft apparatus (7) according to the invention further includes a notification unit and a first notification controlling unit. The notification unit notifies an external. The first notification controlling unit controls the notification unit to notify the external when the condition for expanding the expandable body is satisfied. The first notification controlling unit is connected to the notification unit.

According to the above antitheft apparatus (7), since not only is the motion of the intruder confined by the foam polystyrene or the gas but also the informing operation to the outside (e.g., the police) is carried out, the intruder can be captured quickly.

Also, an antitheft apparatus (8) according to the invention includes a gas injection system, an intruder detection unit, and a fourth controlling unit. The gas injection system includes a driving unit for injecting gas into the vehicle. The intruder detection unit detects an intruder into the vehicle. The fourth controlling unit for controls the driving unit of the gas injection system to inject the gas into the vehicle when the intruder detection unit detects that an intruder is present in the vehicle.

Also, in an antitheft apparatus (9) according to the invention, in addition to the above antitheft apparatus (8), the intruder detection unit detects that a person sits on a seat of the vehicle. The fourth controlling unit controls the driving unit of the gas injection system to inject the gas into the vehicle when a first condition is satisfied and the intruder detection unit detects the sitting.

According to the above antitheft apparatus (8) or (9), the antitheft apparatus installed in the vehicle includes the gas injection system, which injects the gas into the vehicle. since the view of the intruder is obstructed or the intruder is surprised by injecting the gas into the vehicle when the presence of the intruder in the vehicle is detected, the motion of the intruder can be confined or the intruder can be driven away from the vehicle. Therefore, the antitheft apparatus, which is improved in security performance, can be implemented.

In addition, according to the above antitheft apparatus (9), the gas is injected into the vehicle when not only the presence of the intruder is detected but also the sitting of the intruder on the driver's seat or the like is detected. Thus, the view of the intruder can be obstructed more surely.

Also, an antitheft apparatus (10) according to the invention includes a gas injection system, a pre-intrusion detection unit, and a fifth controlling unit. The gas injection system includes a driving unit for injecting gas into the vehicle. The pre-intrusion detection unit detects a person who is going to intrude into the vehicle. The fifth controlling unit controls the driving unit of the gas injection system to inject the gas into the vehicle when a first predetermined time has been lapsed since the pre-intrusion detection unit detects the person.

According to the above antitheft apparatus (10), the antitheft apparatus installed in the vehicle includes the gas injection system, which injects the gas into the vehicle. The gas is injected into the vehicle when the first predetermined time (e.g., the time required until the person who is going to commit the vehicle robbery sits on the driver's seat or the passenger seat after he or she comes close to the vehicle) has lapsed after the person who is going to enter into the vehicle (e.g., the person who comes close to the vehicle) is detected.

That is, the view of the intruder is obstructed or the intruder is surprised by injecting the gas into the vehicle at a time when the person who is going to commit the vehicle robbery sits on the driver's seat or the passenger seat. Therefore, the motion of the intruder can be confined or the intruder can be driven away from the vehicle. Therefore, the antitheft apparatus, which is improved in security performance, can be implemented.

By the way, the above antitheft apparatus (8) injects the gas into the vehicle when the presence of the intruder in the vehicle is detected. Hence, in order to work normally the security operation of the antitheft apparatus (8), the signal supplied from the sensor, which is installed into the vehicle having the antitheft apparatus, for detecting the intruder into the vehicle must be acquired.

However, there is such a possibility that the intruder who has the skilled technique destroys such sensor. Thus, if the sensor is destroyed before the sensor detects the presence of the intrusion, the gas cannot be injected into the vehicle. Therefore, such a problem is caused that the motion of the intruder cannot be confined.

In contrast, the above antitheft apparatus (10) is not an antitheft apparatus expands the expandable body when the presence of the intruder in the vehicle is detected. The gas is injected when the first predetermined time (e.g., a time required until the person who is going to commit the vehicle robbery sits on the driver's seat or the passenger seat after he or she comes close to the vehicle) has lapsed after the person who is going to enter into the vehicle (e.g., the person who comes close to the vehicle) is detected.

Therefore, in order to work normally the security operation of the antitheft apparatus (10), merely the signal supplied from the sensor, which is installed into the vehicle having the antitheft apparatus, for detecting the person who comes close to the vehicle may be acquired.

Of course, there is possibility that the intruder who has the skilled technique destroys the sensor. However, the sensor detects not the presence of the intruder in the vehicle but the person who comes close to the vehicle (i.e., the person who is going to enter into the vehicle). Such a situation is seldom considered that the sensor is destroyed before the sensor detects the person who is coming close to the vehicle.

Therefore, even though the sensor is destroyed, the intruder can be repelled by injecting the gas into the vehicle.

Also, an antitheft apparatus (11) according to the invention includes a seat-state changing system, an intruder detection unit, and a sixth controlling unit. The seat-state changing system includes a driving unit for changing a state of a seat disposed in the vehicle. The intruder detection unit detects an intruder into the vehicle. The sixth controlling unit controls the driving unit of the seat-state changing system to change the seat in a first state to confine a motion of the intruder when the intruder detection unit detects that an intruder is present in the vehicle.

Also, in an antitheft apparatus (12) according to the invention, in addition to the antitheft apparatus (11), the intruder detection unit detects that a person sits on a seat of the vehicle. The sixth controlling unit controls the driving unit of the seat-state changing system to change the seat in the first state to confine a motion of the intruder when a first condition is satisfied and the intruder detection unit detects the sitting.

According to the above antitheft apparatus (11) or (12), the antitheft apparatus installed in the vehicle includes the seat-state changing system including a driving unit for changing a state of a seat disposed in the vehicle. The motion of the intruder can be confined by changing the condition of the seat into the first state (e.g., a state in which the seat is slid/moved to a forward in the vehicle) when the presence of the intruder in the vehicle is detected. Thus, the intruder can be captured. Therefore, the antitheft apparatus, which is improved in security performance, can be implemented.

In addition, according to the above antitheft apparatus (12), the condition of the seat is changed into the first state when not only the presence of the intruder is detected but also the sitting of the intruder on the driver's seat or the like is detected. Therefore, the motion of the intruder can be confined more surely.

Also, an antitheft apparatus (13) according to the invention includes a seat-state changing system, a pre-intrusion detection unit, and a seventh controlling unit. The seat-state changing system includes a driving unit for changing a state of a seat disposed in the vehicle. The pre-intrusion detection unit detects a person who is going to intrude into the vehicle. The seventh controlling unit controls the driving unit of the seat-state changing system to change the seat in a first state to confine a motion of the intruder when a first predetermined time has been lapsed since the pre-intrusion detection unit detects the person.

According to the above antitheft apparatus (13), the antitheft apparatus installed in the vehicle has the seat-state changing system including a driving unit for changing a state of a seat disposed in the vehicle. When the first predetermined time (e.g., an time required until the person who is going to commit the vehicle robbery sits on the driver's seat or the passenger seat after he or she comes close to the vehicle) has lapsed since the person who is going to enter into the vehicle (e.g., the person who comes close to the vehicle) is detected, the condition of the seat is changed into the first state (e.g., the state in which the seat is slid/moved to the forward side of the vehicle).

That is, the motion of the intruder is confined by changing the condition of the seat into the first state at a time when the person who is going to commit the vehicle robbery sits on the driver's seat or the passenger seat. Thus, the intruder can be captured. Therefore, the antitheft apparatus, which is improved in security performance, can be implemented.

Meanwhile, the antitheft apparatus (11) changes the condition of the seat into the first state when the presence of the intruder in the vehicle is sensed. Therefore, in order to operate normally the security operation of the antitheft apparatus (11), the signal supplied from the sensor, which is installed into the vehicle having the antitheft apparatus, for detecting the intruder into the vehicle, etc. must be acquired.

However, there is such a possibility that the intruder who has the skilled technique destroys such sensor. Thus, if the sensor is destroyed before the sensor detects the presence of the intrusion, the condition of the seat cannot be changed into the first state. Thus, such a problem is caused that the motion of the intruder cannot be confined.

In contrast, the above antitheft apparatus (13) is not an antitheft apparatus, which changes the condition of the seat into the first state when the presence of the intruder in the vehicle is detected. However, the condition of the seat is changed into the first state when the first predetermined time (e.g., a time required until the person who is going to commit the vehicle robbery sits on the driver's seat or the passenger seat after he or she comes close to the vehicle) has lapsed since the person who is going to enter into the vehicle (e.g., the person who comes close to the vehicle) is detected.

Therefore, in order to operate normally the security operation of the antitheft apparatus (13), merely the signal supplied from the sensor, which is installed in the vehicle having the antitheft apparatus, for detecting the person who comes close to the vehicle, etc. may be acquired.

Of course, it is possible that the intruder who has the skilled technique destroys the sensor. However, the sensor detects not the presence of the intruder in the vehicle but the person who comes close to the vehicle (i.e., the person who is going to enter into the vehicle). Such a situation is seldom thought of that the sensor is destroyed before the sensor detects the person who comes close to the vehicle.

As a result, even though destruction of the sensor is caused, changing the condition of the seat into the first state can confine the motion of the intruder.

Also, in the antitheft apparatus (14) according to the invention, in addition to any one of the above antitheft apparatuses (11) to (13), the first state is at least one of a state in which the seat is moved forward in the vehicle and a state in which a back portion of the seat is inclined to the forward in the vehicle.

According to the antitheft apparatus (14), the first state is the state in which the seat is moved to the forward in the vehicle and/or the state in which the back portion of the seat is inclined to forward in the vehicle. Thus, when the intruder sits on the driver's seat, for example, the driver's seat is slid/moved forward or the back portion of the seat is inclined forward. Therefore, the motion of the intruder can be confined without fail not to inflict a serious injury upon even the intruder.

Also, in addition to any one of the antitheft apparatuses (11) to (14), an antitheft apparatus (15) according to the invention further includes a steering-wheel-state changing system and an eighth controlling unit. The steering-wheel-state changing system includes a driving unit for changing a state of a steering wheel disposed in the vehicle. The eighth controlling unit controls the driving unit of the steering-wheel-state changing system to change the steering wheel in a second state to confine a motion of the intruder when a condition for changing the seat into the first state is satisfied.

According to the antitheft apparatus (15), when the condition required to change the condition of the seat into the first state is satisfied, not only the condition of the seat is changed into the first state but also the condition of the steering wheel can be changed in the second state (e.g., the state in which the steering wheel is tilted downward).

Therefore, even if the intruder could not be sufficiently confined only by changing the condition of the seat, changing the condition of the steering wheel can confine the intruder more surely.

Also, in an antitheft apparatus (16) according to the invention, in addition to the above antitheft apparatus (15), the second state is at least one of a state in which the steering wheel is inclined downward in the vehicle and a state in which the steering wheel projects rearward in the vehicle.

According to the above antitheft apparatus (16), the second state is the state in which the steering wheel is tilted downward and/or the state in which the steering wheel is protruded to the backward side of the vehicle. Thus, when the intruder sits on the driver's seat, or the like, for example, the steering wheel is tilted downward or the steering wheel is protruded toward the intruder. Therefore, the motion of the intruder can be confined without fail not to inflict a serious injury upon even the intruder.

Also, in addition to any one of the antitheft apparatuses (11) to (16), an antitheft apparatus (17) according to the invention further includes an expandable body system and a ninth controlling unit. The expandable body system expands an expandable body in a predetermined space in the vehicle. The ninth controlling unit controls a driving unit of the expandable body system to expand the expandable body when the condition for changing the seat into the first state is satisfied. The ninth controlling unit is connected to the driving unit of the expandable body system.

Also, in the antitheft apparatus (18) according to the invention, in addition to the above antitheft apparatus (17), the predetermined space portions are located around the seat.

According to the above antitheft apparatus (17) or (18), when the condition required to change the condition of the seat into the first state is satisfied, not only the condition of the seat is changed into the first state but also the expandable body can be expanded. Therefore, even if the intruder could not be sufficiently confined only by changing the condition of the seat, expanding the expandable body can confine the intruder more surely.

In addition, according to the above antitheft apparatus (18), since the expandable body is expanded around the seat, particularly the person who is sitting on the seat can be confined without fail and can be captured.

Also, in an antitheft apparatus (19) according to the invention, in addition to the above antitheft apparatus (17) or (18), the driving unit of the expandable body system ejects a material serving as a source of foam polystyrene into the vehicle and injects steam to the ejected material.

According to the antitheft apparatus (19), the driving unit of the expandable body system ejects the material serving as the source of foam polystyrene into the vehicle and injects the steam to the ejected material. Thus, the foam polystyrene (polystyrene containing bubbles) confines the motion of the intruder when the intruder in the vehicle is sensed. Therefore, the motion of the intruder can be confined not to inflict a serious injury upon even the intruder.

Also, in an antitheft apparatus (20) according to the invention, in addition to the above antitheft apparatus (17) or (18), the expandable body system is an air bag system.

According to the antitheft apparatus (20), the expandable body system is an air bag system. Thus, when the intruder in the vehicle is sensed, expanding the air bag can confine the motion of the intruder. Also, because the air bag system is not newly installed into the vehicle to prevent the vehicle robbery, cost reduction can be achieved.

Also, in addition to any one of the above antitheft apparatuses (11) to (20), an antitheft apparatus (21) according to the invention a gas injection system and a tenth controlling unit. The gas injection system includes a driving unit for injecting gas into the vehicle. The tenth controlling unit controls the driving unit of the gas injection system to inject the gas into the vehicle when a third condition is satisfied.

According to the antitheft apparatus (21), when the third condition is satisfied (e.g., the certain time has lapsed after the condition of the seat is changed) after the condition required to change the condition of the seat into the first state is satisfied, the gas such as the steam, the cold air, etc. can be injected into the vehicle.

Therefore, even if only changing the condition of the seat could not confine the intruder, the intruder can be driven away by injecting the gas.

Also, in addition to any one of the above antitheft apparatuses (11) to (21), an antitheft apparatus (22) according to the invention further includes a notification unit and a second notification controlling unit. The notification unit notifies an external. The second notification controlling unit controls the notification unit to notify the external when the condition for changing the seat into the first state is satisfied. The second notification controlling unit is connected to the notification unit.

According to the antitheft apparatus (22), since not only is the motion of the intruder confined by changing the condition of the seat but also the informing operation to the outside (e.g., the police) is carried out, the intruder can be captured quickly.

Also, an antitheft apparatus (23) according to the invention includes a capturing unit, a breakage detection unit, an intrusion detection unit, a first determination unit, and an eleventh controlling unit. The capturing unit, which can capture a body of an intruder, is disposed in the vehicle. The breakage detection unit detects breakage of window glass. The intrusion detection unit detects intrusion into the vehicle. The first determination unit determines as to whether or not the window glass is broken and the intrusion into the vehicle occurs, based on a signal from the breakage detection unit and a signal from the intrusion detection unit. The eleventh controlling unit controls a driving unit of the capturing unit to capture the body of the intruder when the first determination unit determines that the window glass is broken and the intrusion into the vehicle occurs.

According to the antitheft apparatus (23), the antitheft apparatus installed in the vehicle has the capturing unit, which can capture a body of an intruder such as a hand of the intruder entering through the window whose window glass is broken, disposed in the vehicle. Driving the capturing unit can capture the body of the intruder when the window glass is broken and also the entry of the intruder into the vehicle is sensed. Therefore, the antitheft apparatus, which is improved in security performance, can be implemented.

As a result, if the person who is going to commit the vehicle robbery (i.e., the intruder) breaks the window glass, then inserts the hand through the window whose door window glass is broken, and then tries to release the door lock, for example, the intruder can be bound by capturing the hand that is inserted through the window.

Also, an antitheft apparatus (24) according to the invention includes a capturing unit, a breakage detection unit, a second determination unit, and a twelfth controlling unit. The capturing unit, which can capture a body of an intruder, is disposed in the vehicle. The breakage detection unit detects breakage of window glass. The second determination unit determines as to whether or not a second predetermined time has been lapsed since the window glass is broken. The twelfth controlling unit controls a driving unit of the capturing unit to capture the body of the intruder when the second determination unit determines the second predetermined time has been lapsed since the window glass is broken.

According to the antitheft apparatus (24), the antitheft apparatus installed in the vehicle has the capturing unit, which can capture a body of an intruder such as a hand of the intruder entering through the window whose window glass is broken, disposed in the vehicle. When the second predetermined time (a time required until the person who is going to commit the vehicle robbery inserts the hand through the window whose window glass is broken after he or she broke the window glass) has lapsed since the window glass is broken, the body of the intruder can be captured by driving the capturing system. Therefore, the antitheft apparatus, which is improved in security performance, can be implemented.

Meanwhile, the above antitheft apparatus (23) drives the capturing unit when the intrusion into the vehicle is detected after the window glass is broken. Therefore, in order to operate normally the security operation of the antitheft apparatus (23), the signal supplied from the sensor, which is installed in the vehicle having the antitheft apparatus, for detecting the intruder into the vehicle, etc. must be acquired.

However, there is such a possibility that the intruder who has the skilled technique destroys such sensor. Thus, if the sensor is destroyed before the sensor senses the presence of the intrusion, the condition of the seat cannot be changed into the first state. Thus, such a problem is caused that the motion of the intruder cannot be confined.

In contrast, the above antitheft apparatus (24) is not an antitheft apparatus, which drives the capturing system when the intrusion into the vehicle is sensed after the window glass is broken. However, the capturing unit is driven when the second predetermined time (e.g., a time required until the person who is going to commit the vehicle robbery inserts the hand through the window whose window glass is broken after he or she broke the window glass) has lapsed since the window glass is broken. Therefore, generation of the above problem can be avoided.

Also, in an antitheft apparatus (25) according to the invention, in addition to any one of the above antitheft apparatuses (23) to (24), the capturing unit can try to capture the intruder at least two times with regard to the same window. The antitheft apparatus (25) further includes a third determination unit and a thirteenth controlling unit. The third determination unit determines as to whether or not the capturing unit succeeds in the capture of the body of the intruder. The thirteenth controlling unit controls the driving unit of the capturing unit to capture the body of the intruder again when the third determination unit determines that the capturing unit fails to capture the body of the intruder.

By the way, in the antitheft apparatus (24), the second predetermined time is set to the time required until the person who is going to commit the vehicle robbery inserts the hand through the window whose window glass is broken after he or she broke the window glass, for example. In this case, if the person who is going to commit the vehicle robbery (i.e., the intruder) does not insert the hand from the window until the predetermined time has lapsed after he or she breaks the window glass, the intruder cannot be captured by using the capturing unit.

Also, like the antitheft apparatus (23), if the capturing unit is driven after the intrusion into the vehicle is detected, there may be considered the situation such that the intruder cannot be precisely captured due to any reason.

However, according to the antitheft apparatus (25), if the body of the intruder could not be captured by driving the capturing unit, the driving unit can be driven once again. That is, if the capturing unit fails to capture the intruder, the capturing unit can try the capturing operation once again.

Therefore, for example, if the intruder could not be captured by the first capturing trial, the second trial may be applied. Then, if such second trial still fails to capture the intruder, the third trial may be applied. Thus, the capture of the intruder can be carried out more surely.

Also, in an antitheft apparatus (26) according to the invention, in addition to the above antitheft apparatus (23) or (24), the capturing unit can try to capture the intruder at least two times with regard to the same window. The antitheft apparatus (26) further includes a fourth determination unit and a fourteenth controlling unit. The fourth determination unit determines as to whether or not a third predetermined time has been lapsed since previous driving of the capturing unit. The fourteenth controlling unit controls the driving unit of the capturing unit to capture the body of the intruder again when the fourth determination unit determines that the third predetermined time has been lapsed since the previous driving of the capturing unit.

According to the antitheft apparatus (26), if the third predetermined time (e.g., 3 second) has lapsed from the previous drive of the capturing system, the driving unit is driven once again. That is, the capture is tried at least twice, the capture of the intruder can be carried out more surely.

Also, in an antitheft apparatus (27) according to the invention, in addition to any one of the antitheft apparatus (23) to (27), the capturing unit includes wires, which are wound round window frames, to capture the body of the intruder.

According to the antitheft apparatus (27), the wires that are utilized to capture the intruder are wound round the window frames and thus it is difficult to find the device for capturing the intruder (i.e., wires) from the outside. Therefore, the intruder can be captured more precisely.

Also, in an antitheft apparatus (28) according to the invention, in any one of the above antitheft apparatus (23) to (27), the capturing unit captures the body of the intruder, who intrudes into the vehicle from a particular window. The particular window includes at least one of door windows of the vehicle.

By the way, it seems that the person who tries to enter into the vehicle by breaking the window glass often breaks not the front window glass or the rear window glass but the door window glass as the door windows (ventilation windows containing the so-called quarter windows) whose door lock is easily released. Therefore, according to the antitheft system (4), since the device for capturing the intruder is provided to the window through which the intruder enters, the effective antitheft system can be implemented at a small cost.

DETAILED DESCRIPTION OF THE PREFERRED EMBODIMENTS

Figure 1:
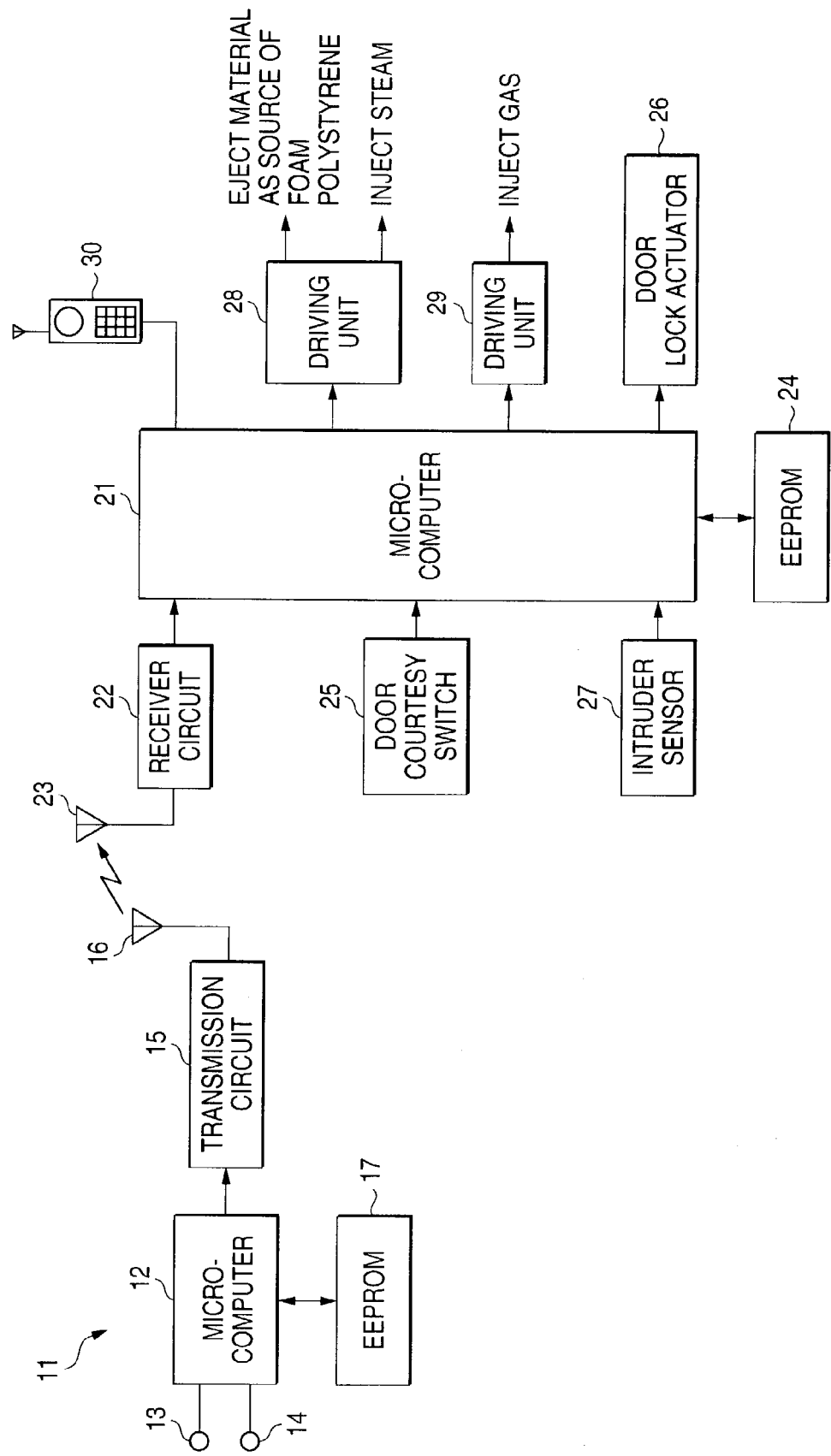
FIG. 1 is a block diagram showing schematically main portions of an antitheft system, which utilizes an antitheft apparatus according to an embodiment (1) of the invention.

Embodiments of an antitheft apparatus and an antitheft system according to the invention will be explained with reference to the drawings hereinafter. FIG. 1 is a block diagram showing schematically main portions of an antitheft system, which utilizes an antitheft apparatus according to an embodiment (1) of the invention.

In FIG. 1, numeral 11 denotes a transmitter. The transmitter 11 includes a microcomputer 12, a lock switch 13, an unlock switch 14, a transmission circuit 15, an antenna 16, and an EEPROM 17 for storing an ID code.

The lock switch 13 and the unlock switch 14 are connected to input terminals of the microcomputer 12. When the lock switch 13 or the unlock switch 14 is pushed, the microcomputer 12 receives a door lock command code that corresponds to each switch from a ROM (not shown). Then, the microcomputer 12 transmits a signal, which is obtained by adding the door lock command code to the ID code, from the antenna 16 via the transmission circuit 15.

A microcomputer 21 constituting a main body of the antitheft system decides whether or not the ID code contained in the signal (the ID code+the door lock command code), which is received via an antenna 23 and a receiver circuit 22, coincides with the ID code stored in an EEPROM 24. If the ID codes coincide with each other, the microcomputer 21 applies process in response to the door lock command code contained in the above signal and a signal supplied from a door courtesy switch 25, which detects an open/close state of the door.

For example, if the door lock command code indicates locking a door and a detected signal supplied from the door courtesy switch 25 indicates the closed state of the door, the microcomputer 21 controls a door lock actuator 26 to lock the door and also sets an arming mode (i.e., a set state of a security system). Also, if the door lock command code indicates unlocking the door, the microcomputer 21 controls the door lock actuator 26 to unlock the door and also cancels the arming mode to set a disarming mode (i.e., a reset state of the security system).

Also, if the arming mode is set, the microcomputer 21 receives a signal supplied from an intruder sensor 27, which detects the intruder entering into a compartment. The microcomputer ejects a great deal of material (e.g., grains of about 5 mm diameter) as a source of foam polystyrene into spaces around the driver's seat and the passenger seat on a basis of the received signal. In addition, the microcomputer 21 may control a driving unit 28, which starts a function of injecting a steam to the ejected material. Also, the microcomputer 21 may control a driving unit 29, which starts a function of injecting a large quantity of steam(or cold air) to such extent that the steam can obstruct the view of the intruder. Furthermore, the microcomputer 21 may control a mobile phone 30 to inform the police of the intrusion. In this case, as the intruder sensor 27, a method of detecting a motion of the intruder in the compartment by using an ultrasonic wave is named.

Next, a processing operation (1) executed by the microcomputer 21 in the antitheft system, which employs the antitheft apparatus according to the embodiment (1), will be explained with reference to a flowchart shown in FIG. 2.

First, it is decided whether or not a flag $f_1$ indicating that the intruder is present in the compartment is set to 1 (step S1) If it is decided that the flag $f_1$ is not set to 1, it is decided whether or not the arming mode is being set (step S2). If it is decided that the arming mode is being set, it is decided based on the signal supplied from the intruder sensor 27 whether or not the intruder is present in the compartment (step S3). In contrast, if it is decided that the arming mode is not being set, the processing operations (1) are ended.

If it is decided by the decision in step S3 that the intruder is present in the compartment, the flag $f_1$ is set to 1. Then, a timer t is started (step S5). Then, the driving unit 28 is controlled so that the material as the source of foam polystyrene is ejected into spaces around the driver's seat and the passenger seat and the steam is injected to the material. In addition, the mobile phone 30 is used to inform the police of the intrusion (step S7). Then, the process proceeds to step S8. In contrast, if it is decided that the intruder is not present in the compartment, there is no necessity to eject the material as the source of foam polystyrene. Thus, the processing operation (1) is ended directly.

In step S8, it is decided by the timer t whether or not a predetermined time $t_1$ (e.g., 20 second) has lapsed (step S8). If it is decided that the predetermined time $t_1$ has lapsed from a start of the timer t, i.e., the predetermined time $t_1$ has lapsed from a start of the formation of foam polystyrene, the driving unit 29 is controlled so that a large quantity of steam (or cold air) is injected (step S9) Then, the flag $f_1$ is reset to 0 (step S10). In contrast, if it is decided by the timer t that the predetermined time $t_1$ has not lapsed, the processing operations (1) are ended directly.

By the way, if it is decided in the decision process in step S1 that the flag $f_1$ is set to 1, the foam polystyrene has already been formed and also the police has already been informed. Thus, steps S2 to S7 are skipped and the process goes to step S8.

According to the antitheft apparatus according to the embodiment (1), if the intruder is detected in the compartment, the intruder can be discouraged by ejecting the material as the source of foam polystyrene into spaces around the driver's seat and the passenger seat, injecting the steam to the material to expand the material (e.g., about 30 to 80 times), and confining a motion of the intruder by the expanded foam polystyrene.

Also, not only is the foam polystyrene formed but also a large quantity of steam (or cold air) is injected into the compartment. Therefore, even if the foam polystyrene cannot confine the intruder, it is possible to repel the intruder by the gas. In addition, since not only is the motion of the intruder sealed by the foam polystyrene or the gas but also the informing operation to the outside (e.g., the police) is carried out, the intruder can be captured quickly.

Figure 3:
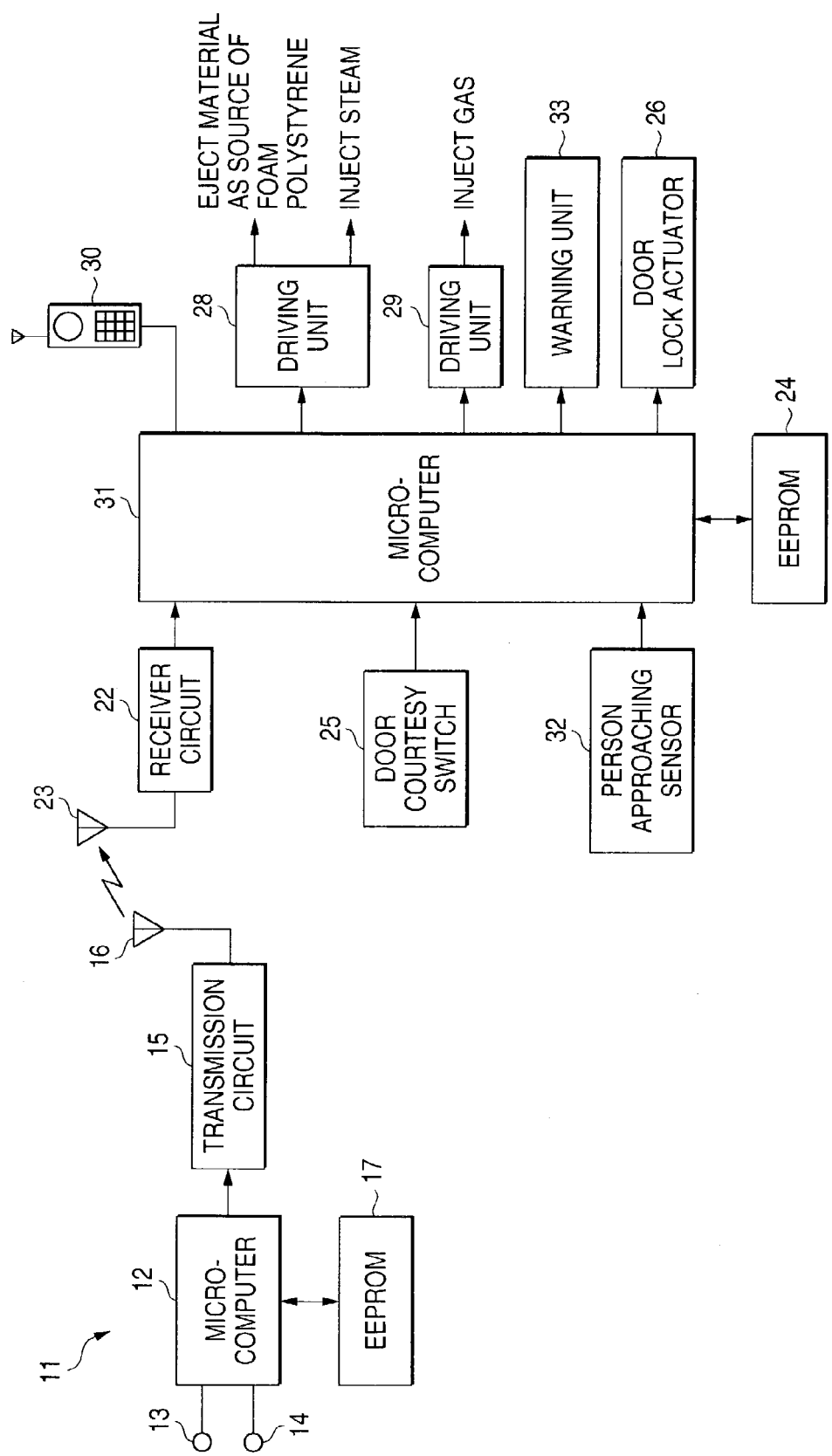
FIG. 3 is a block diagram showing schematically main portions of an antitheft system, which utilizes an antitheft apparatus according to an embodiment (2) of the invention.

FIG. 3 is a block diagram showing schematically main portions of an antitheft system, which employs an antitheft apparatus according to an embodiment (2) of the invention. In this case, same numerals are allotted to constituent portions similar to those of the antitheft system shown in FIG. 1, and thus their explanation will be omitted herein.

A microcomputer 31 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 31 performs a process in response to the door lock command code contained in the above signal and the signal supplied from the door courtesy switch 25, which detects the open/close state of the door.

Also, the microcomputer 31 receives a signal supplied from a person approaching detector 32, which detects a person who is going to enter into the compartment (here, a person who comes close to the vehicle). The microcomputer 31 controls the driving unit 28, the driving unit 29, the mobile phone 30, and a warning unit 33 based on the signal supplied from the person approaching detector 32. In this case, a method of detecting a motion of the person who comes close to the vehicle by using the ultrasonic wave, etc. may be listed as the person approaching detector 32.

Figure 4:
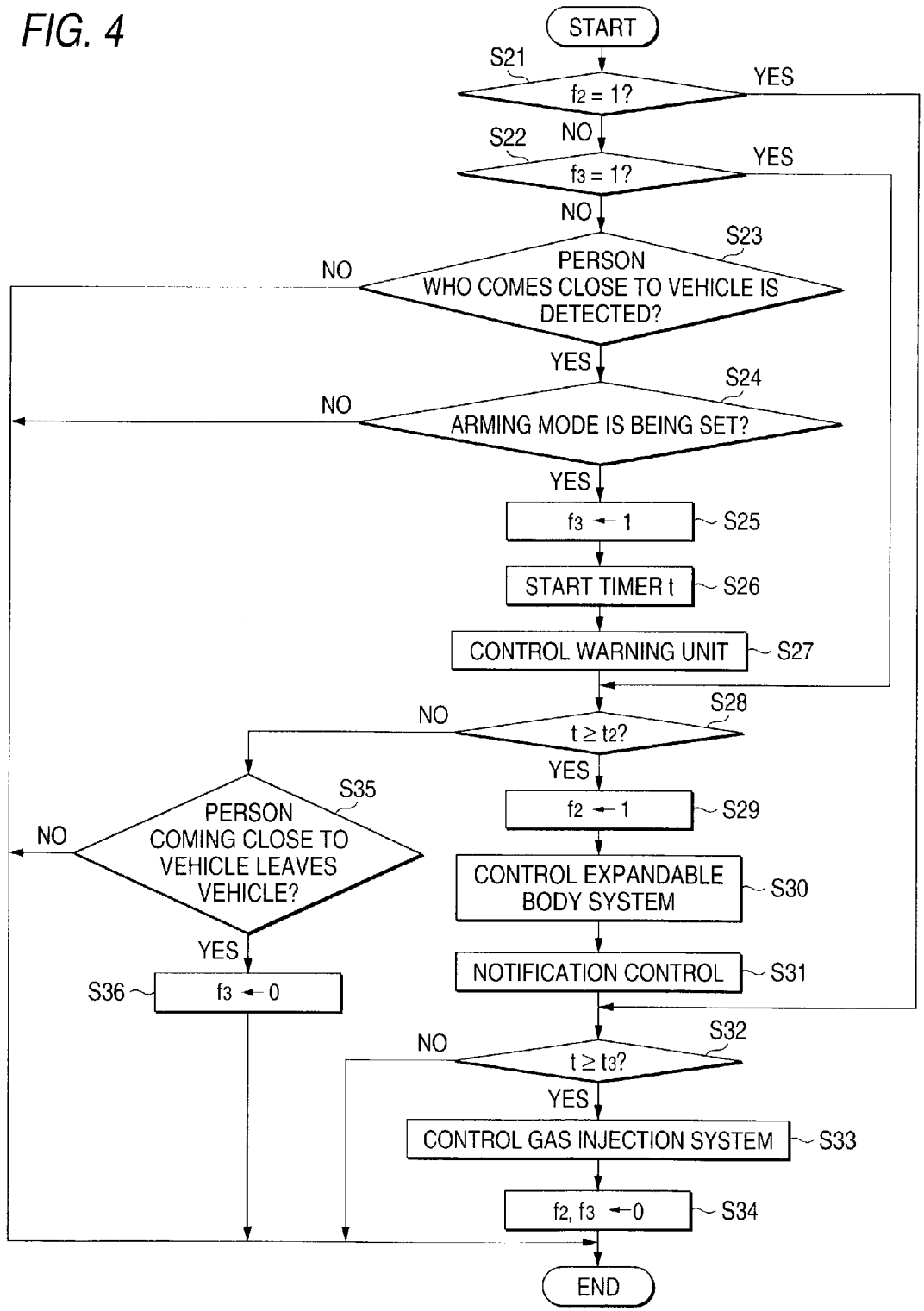
FIG. 4 is a flowchart showing processing operations executed by the microcomputer in the antitheft system, which utilizes the antitheft apparatus according to the embodiment (2).

Next, a processing operation (2) executed by the microcomputer 31 in the antitheft system, which employs the antitheft apparatus according to the embodiment (2), will be explained with reference to a flowchart shown in FIG. 4. First, it is decided whether or not a flag $f_2$ (see step S29 described later) indicating that an intruder is present in the compartment is set to 1 (step S21). Then, if it is decided that the flag $f_2$ is not set to 1, it is decided whether or not a flag $f_3$ indicating that a person who comes close to the vehicle is present is set to 1 (step S22).

If it is decided that the flag $f_3$ is not set to 1, it is decided, based on the signal supplied from the person approaching detector 32, whether or not a person who is going to come close to the vehicle is present (step S23). If it is decided that a person who comes close to the vehicle is present, it is decided whether or not the arming mode is being set (step S24). In contrast, if it is decided that a person who comes close to the vehicle is not present, the processing operation (2) is ended.

If it is decided in the decision in step S24 that the arming mode is being set, the flag $f_3$ is set to 1 (step S25). Then, a timer t is started (step S26). The warning unit 33 is controlled to sound a warning buzzer (step S27). Then, it is decided by the timer t whether or not a predetermined time $t_2$ (e.g., 10 second) has lapsed (step S28). In contrast, if it is decided that the arming mode is not being set, the processing operation (2) is ended.

If it is decided in the decision in step S28 that the predetermined time $t_2$ has lapsed from a start of the timer t, it is judged that the person who is going to come close to the vehicle intrudes into the compartment and then sits on the driver's seat or the passenger seat. Then, the flag $f_2$ is set to 1 (step S29). Then, the driving unit 28 is controlled so that the material as the source of foam polystyrene is ejected into spaces around the driver's seat and the passenger seat and the steam is injected to the material (step S30). Furthermore, the mobile phone 30 is caused to inform the police of the intrusion (step S31). Then, the process goes to step S32.

In step S32, it is decided by the timer t whether or not a predetermined time $t_3$ (e.g., 30 second) has lapsed (step S32). If it is decided that the predetermined time $t_3$ has lapsed from a start of the timer t, i.e., the predetermined time $t_1$ has lapsed from the start of the formation of foam polystyrene, the driving unit 29 is controlled so that a large quantity of steam (or cold air) is injected (step S33). Then, the flags $f_2$, $f_3$ are reset to 0 (step S34). In contrast, if it is decided by the timer t that the predetermined time $t_3$ has not lapsed, the processing operation (2) is ended.

By the way, if it is decided by the timer t in the decision process in step S28 that the predetermined time $t_2$ has not lapsed, it is decided, based on the signal supplied from the person approaching detector 32, whether or not the person who comes close to the vehicle goes away from the vehicle (step S35). If it is decided that the person went away from the vehicle, there is no necessity to eject the material as the source of foam polystyrene into the compartment. Thus, the flag $f_3$ is reset to 0 (step S36). In contrast, if it is decided that the person does not go away from the vehicle, the processing operation (2) is ended.

Also, if it is decided in the decision process in step S22 that the flag $f_3$ is set to 1, a person who comes close to the vehicle has already been detected and also the warning buzzer has already been sounded. Thus, steps S23 to S27 are skipped and then the process goes to step S28. In addition, if it is decided in the decision process in step S21 that the flag $f_2$ is set to 1, the foam polystyrene has already been formed and also the police has already been informed. Thus, steps S22 to S31 are skipped and then the process goes to step S32.

According to the antitheft apparatus according to the above embodiment (2), in the situation that the arming mode is being set, if the predetermined time $t_2$ (e.g., a time required until a person who is going to commit the vehicle robbery sits on the driver's seat or the passenger seat after he or she comes close to the vehicle) has lapsed after the person who is going to intrude into the compartment of the vehicle (e.g., the person who comes close to the vehicle) is detected, the intruder can be captured by ejecting the material as the source of foam polystyrene into the spaces around the driver's seat and the passenger seat, injecting the steam to the material to expand it (e.g., about 30 to 80 times), and confining a motion of the intruder by the expanded foam polystyrene.

That is, since the motion of the intruder is confined by forming the foam polystyrene at the proper time when the person who is going to commit the vehicle robbery sits on the driver's seat or the passenger seat, the intruder can be captured. Therefore, the antitheft apparatus, which is improved in the security performance, can be implemented.

Also, not only is the foam polystyrene formed but also a large quantity of steam (or cold air) is injected into the compartment. Therefore, even if the intruder cannot be confined by the foam polystyrene, it is possible to repel the intruder by the gas. In addition, since not only is the motion of the intruder sealed by the foam polystyrene or the gas but also the informing operation to the outside (e.g., the police) is carried out, the intruder can be captured quickly.

In this case, as the method of detecting the person who is going to intrude into the compartment, only a case where the person approaching detector 32, which detects the person who has come close to the vehicle by using the ultrasonic wave, is explained herein. As another detecting method, a method of deciding logically whether or not the door is opened by a valid way based on signals from a switch for detecting the rotation of the key cylinder, a switch for detecting whether or not the key cylinder is present, and a switch for detecting open/close of the door, a method of detecting that a window glass is broken by a vibration sensor, etc. may be listed.

Figure 5:
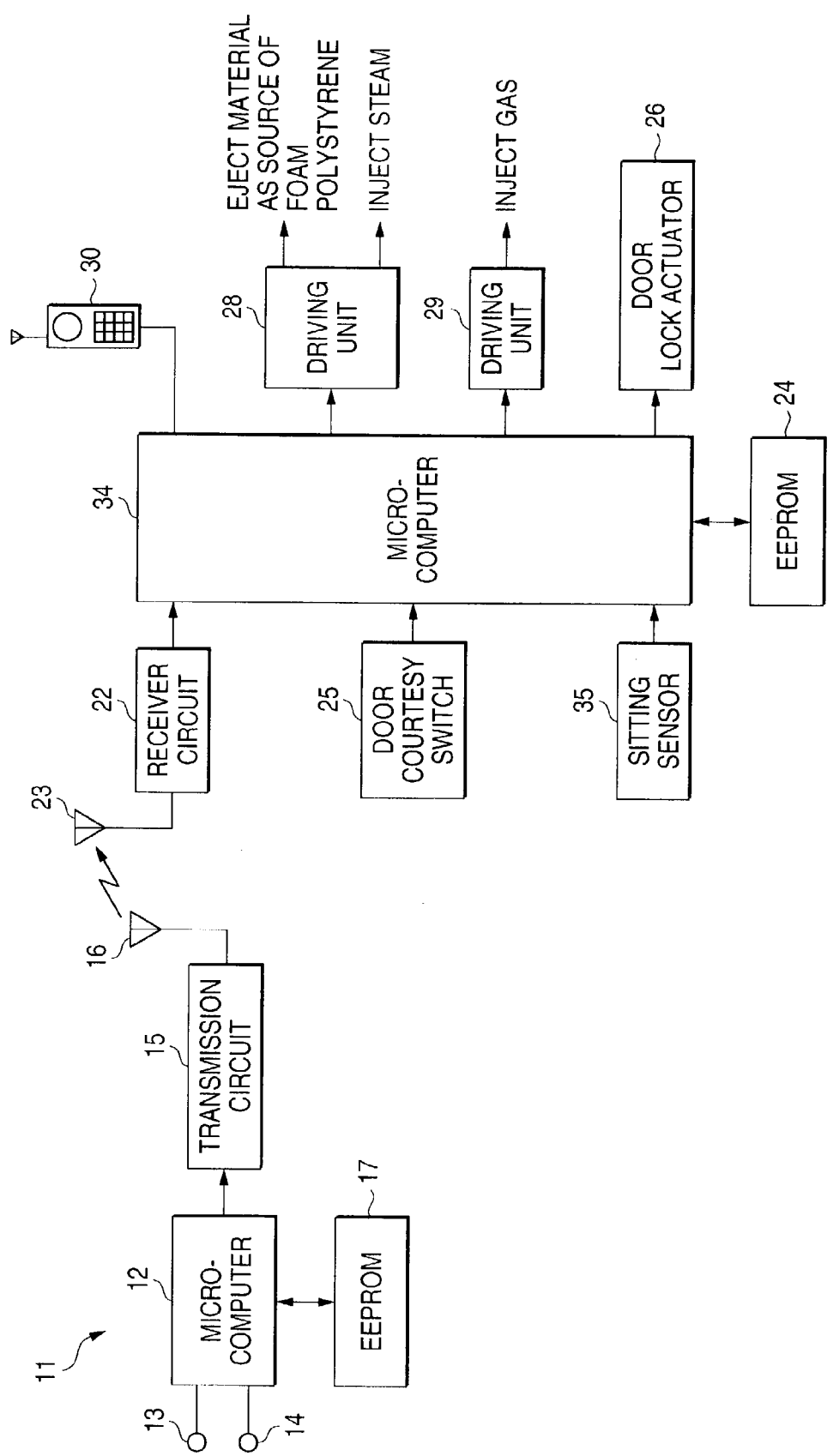
FIG. 5 is a block diagram showing schematically main portions of an antitheft system, which utilizes an antitheft apparatus according to an embodiment (3) of the invention.

FIG. 5 is a block diagram showing schematically main portions of an antitheft system, which utilizes an antitheft apparatus according to an embodiment (3) of the invention. In this case, same numerals are allotted to constituent portions similar to those of the antitheft system shown in FIG. 1, and thus their explanation will be omitted herein.

A microcomputer 34 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 34 performs a process in response to the door lock command code contained in the above signal and the signal supplied from the door courtesy switch 25, which detects the open/close state of the door.

Also, the microcomputer 34 receives a signal supplied from a sitting sensor 35, which detects sitting on the driver's seat or the passenger seat. The microcomputer 34 controls the driving unit 28, the driving unit 29, and the mobile phone 30 based on the signal supplied from the sitting sensor 35. In this case, a method of detecting sitting by using a weight sensor, which is built in the driver's seat or the like, etc. may be listed as the sitting sensor 35.

Next, a processing operation (3) executed by the microcomputer 34 in the antitheft system, which employs the antitheft apparatus according to the embodiment (3), will be explained with reference to a flowchart shown in FIG. 6. First, it is decided whether or not a flag $f_1$ indicating that the intruder is present in the compartment is set to 1 (step S41) If it is decided that the flag $f_1$ is not set to 1, it is decided based on the signal supplied from the sitting sensor 35 whether or not sitting on the driver's seat or the passenger seat is detected (step S42). If it is decided that the sitting is detected, it is decided whether or not the arming mode is being set (step S43). In contrast, if it is decided that the sitting is not detected, the processing operation (3) is ended.

If it is decided by the decision in step S43 that the arming mode is being set, it is judged that a person who sits on the driver's seat or the passenger seat is a person who intrudes into the compartment (i.e., a person who is not a normal user). Thus, the flag $f_1$ is set to 1 (step S44). Then, a timer t is started (step S45). Then, the driving unit 28 is controlled so that the material as the source of foam polystyrene is ejected into spaces around the driver's seat and the passenger seat and the steam is injected to the material (step S46). Then, the mobile phone 30 is caused to inform the police of the intrusion (step S47). Then, the process goes to step S48. In contrast, if it is decided that the arming mode is not being set, it is judged that the person who sits on the driver's seat or the passenger seat is the person who is the normal user. Thus, since there is no necessity to eject the material as the source of foam polystyrene, the processing operation (3) is ended.

In step S48, it is decided by the timer t whether or not a predetermined time $t_1$ (e.g., 10 second) has lapsed (step S48) If it is decided that the predetermined time $t_1$ has lapsed from a start of the timer t, i.e., the predetermined time $t_1$ has lapsed from the start of the formation of foam polystyrene, the driving unit 29 is controlled so that a large quantity of steam (or cold air) is injected (step S49). Then, the flag $f_1$ is reset to 0 (step S50). In contrast, if it is decided by the timer t that the predetermined time $t_1$ has not lapsed, the processing operation (3) is ended.

By the way, if it is decided in the decision process in step S41 that the flag $f_1$ is set to 1, the foam polystyrene has already been formed and also the police has already been informed. Thus, steps S42 to S47 are skipped and the process goes to step S48.

According to the antitheft apparatus according to the above embodiment (3), in the situation that the arming mode is being set, if the sitting on the driver's seat or the passenger seat is detected, the intruder can be captured by ejecting the material as the source of foam polystyrene into the spaces around the driver's seat and the passenger seat, injecting the steam to the material to expand it (e.g., about 30 to 80 times), and confining a motion of the intruder by the expanded foam polystyrene.

Also, when the intruder sits on the driver's seat or the passenger seat, i.e., when the intruder is present at a predetermined location, the motion of the intruder is confined by the foam polystyrene. Therefore, the intruder can be captured more surely.

Also, not only is the foam polystyrene formed but also a large quantity of steam (or cold air) is injected into the compartment. Therefore, even if the intruder cannot be confined by the foam polystyrene, it is possible to repel the intruder by the gas. In addition, since not only is the motion of the intruder sealed by the foam polystyrene or the gas but also the informing operation to the outside (e.g., the police) is carried out, the intruder can be captured quickly.

Also, in the antitheft apparatus according to any one of the above embodiments (1) to (3), if the intruder is present in the compartment or if the intruder sits on the driver's seat or the like, the motion of the intruder is confined by the foam polystyrene by ejecting the material as the source of foam polystyrene into the spaces around the driver's seat and/or the passenger seat and then injecting the steam to the material. However, in the antitheft apparatus according to another embodiment, the air bag, or the like may be expanded in place of the formation of the foam polystyrene.

Figure 7:
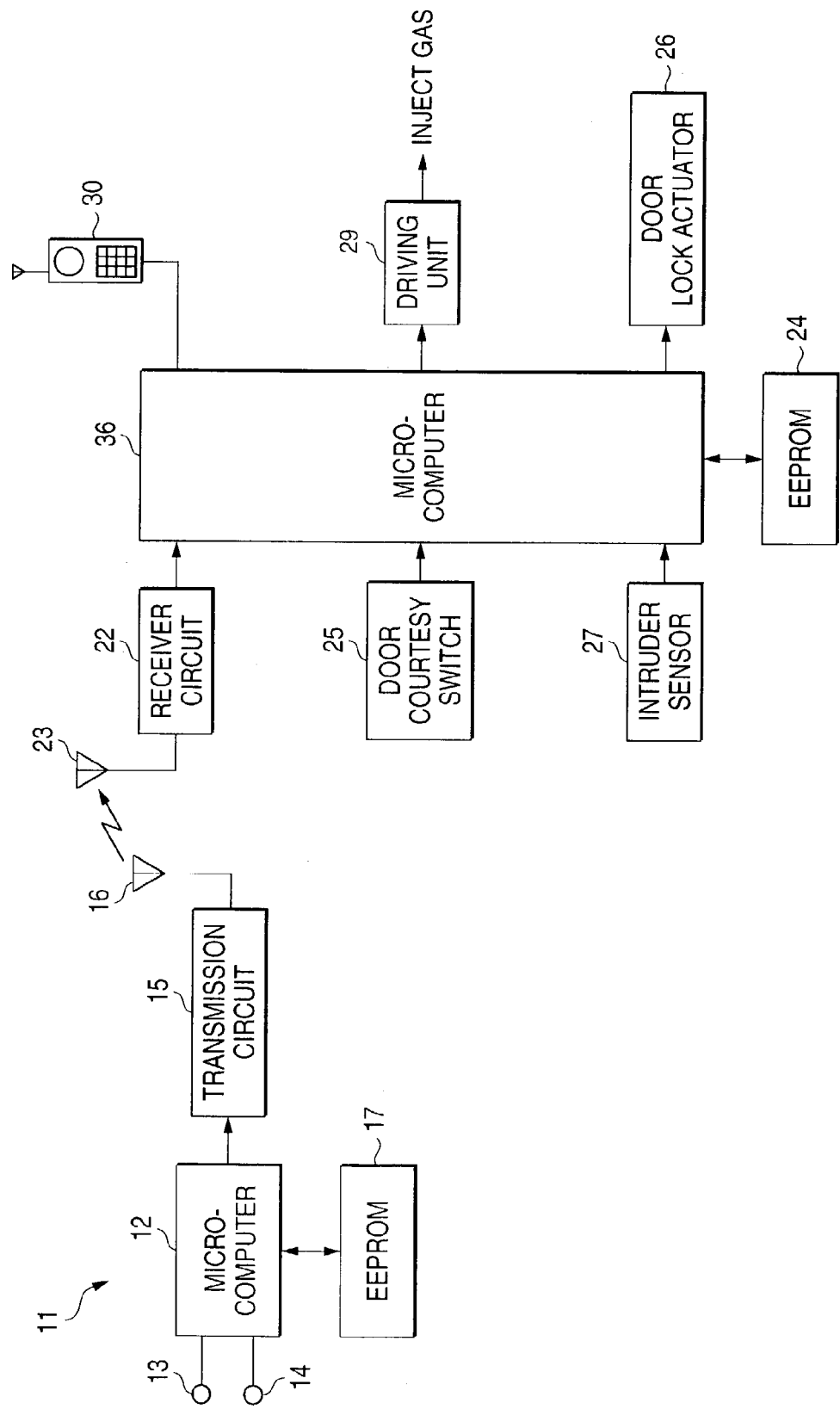
FIG. 7 is a block diagram showing schematically main portions of an antitheft system, which utilizes an antitheft apparatus according to an embodiment (4) of the invention.

FIG. 7 is a block diagram showing schematically main portions of an antitheft system, which utilizes an antitheft apparatus according to an embodiment (4) of the invention. In this case, same numerals are allotted to constituent portions similar to those of the antitheft system shown in FIG. 1, and thus their explanation will be omitted herein.

A microcomputer 36 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 36 performs a process in respond to the door lock command code contained in the above signal and the signal supplied from the door courtesy switch 25, which detects the open/close state of the door.

Also, in the situation that the arming mode is being set, the microcomputer 36 receives the signal supplied from the intruder sensor 27, which detects the intrusion into the compartment. The microcomputer 36 controls, based on the received signal, the driving unit 29, which drives injection of a large quantity of steam (or cold air) in such a manner that the view of the intruder can be obstructed and causes the mobile phone 30 to inform the police of the intruder. In this case, a method of detecting the motion of the intruder in the compartment by using the ultrasonic wave, etc. may be listed as the intruder sensor 27.

Figure 8:
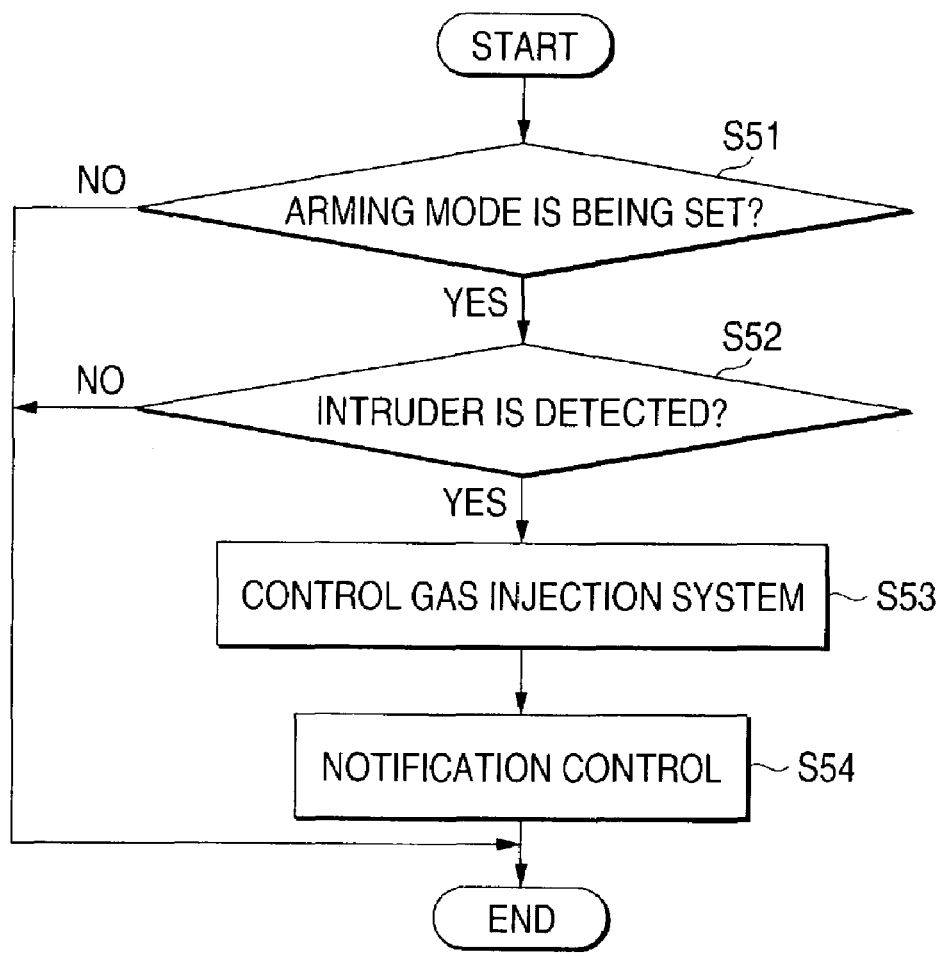
FIG. 8 is a flowchart showing processing operations executed by the microcomputer in the antitheft system, which utilizes the antitheft apparatus according to the embodiment (4).

Next, a processing operation (4) executed by the microcomputer 36 in the antitheft system, which employs the antitheft apparatus according to the embodiment (4), will be explained with reference to a flowchart shown in FIG. 8. First, it is decided whether or not the arming mode is being set (step S51). If it is decided that the arming mode is being set, it is decided based on the signal supplied from the intruder sensor 27 whether or not the intruder is present in the compartment (step S52). In contrast, if it is decided that the arming mode is not being set, the processing operation (4) is ended.

If it is decided by the decision in step S52 that the intruder is present in the compartment, the driving unit 29 is controlled so that a large volume of steam (or cold air) is injected (step S53). Then, the mobile phone 30 is caused to inform the police of the intrusion (step S54). In contrast, if it is decided that the intruder is not present in the compartment, there is no necessity to inject the steam (or cold air). Thus, the processing operation (4) is ended.

According to the antitheft apparatus according to the above embodiment (4), if the intruder is detected in the compartment, a large quantity of steam (or cold air) is injected into the compartment to obstruct the view of the intruder or to surprise the intruder. Thus, either the motion of the intruder can be confined or the intruder can be repelled from the vehicle. In addition, since not only is the view of the intruder obstructed by the gas but also the informing operation to the outside (e.g., the police) is carried out, the intruder can be captured quickly.

Figure 9:
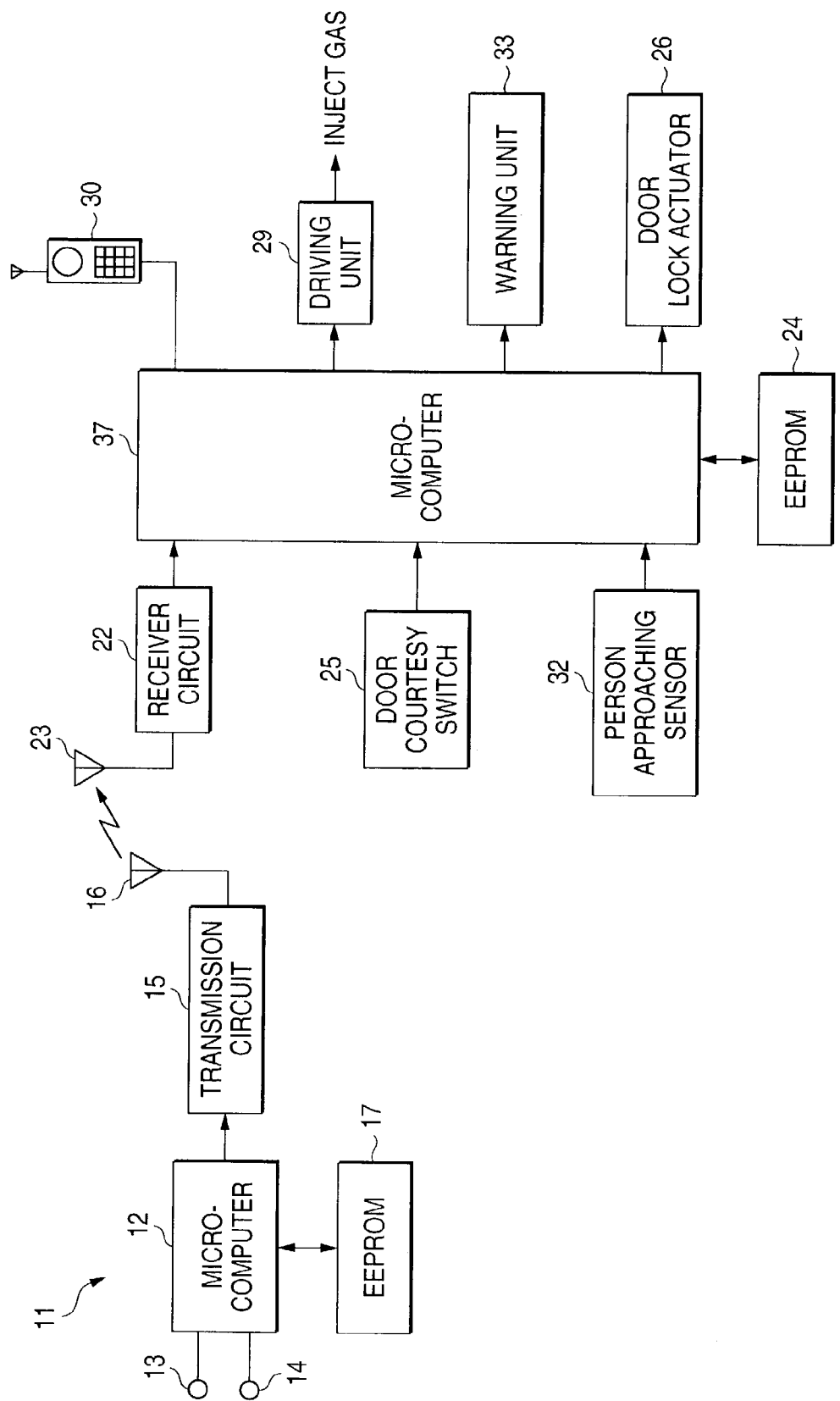
FIG. 9 is a block diagram showing schematically main portions of an antitheft system, which utilizes an antitheft apparatus according to an embodiment (5) of the invention.

FIG. 9 is a block diagram showing schematically main portions of an antitheft system, which t utilizes an antitheft apparatus according to an embodiment (5) of the invention. In this case, same numerals are allotted to constituent portions similar to those of the antitheft system shown in FIG. 1, and thus their explanation will be omitted herein.

A microcomputer 37 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 37 performs a process in response to the door lock command code contained in the above signal and the signal supplied from the door courtesy switch 25, which detects the open/close state of the door.

Also, the microcomputer 37 receives the signal supplied from the person approaching detector 32, which detects a person who is going to intrude into the compartment (here, a person who comes close to the vehicle). The microcomputer 37 controls the driving unit 29, the mobile phone 30, and the warning unit 33 based on the signal supplied from the person approaching detector 32. In this case, a method of detecting the motion of the person who comes close to the vehicle by using the ultrasonic wave, etc. may be listed as the person approaching detector 32.

Figure 10:
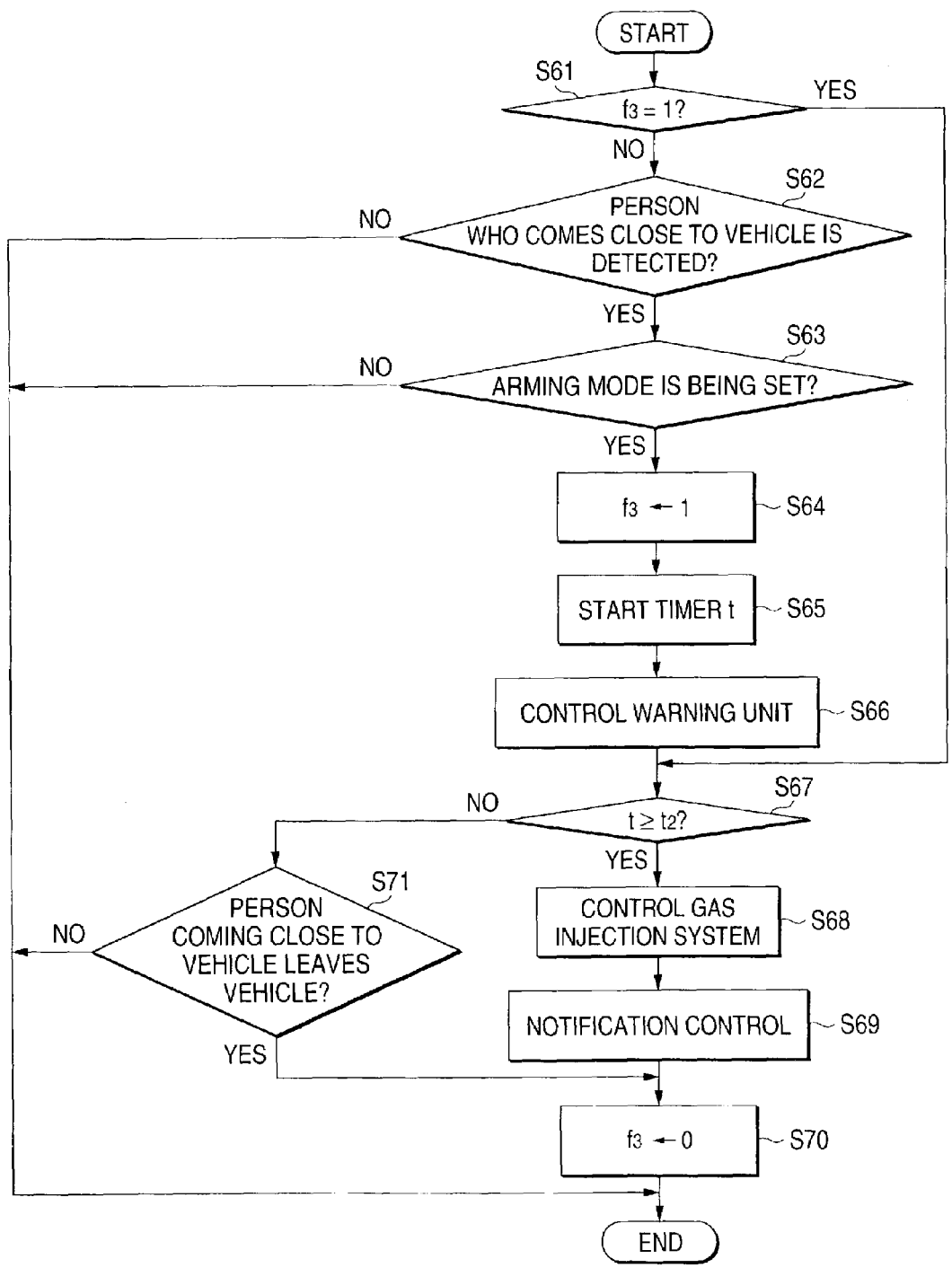
FIG. 10 is a flowchart showing processing operations executed by the microcomputer in the antitheft system, which utilizes the antitheft apparatus according to the embodiment (5).

Next, a processing operation (5) executed by the microcomputer 37 in the antitheft system, which employs the antitheft apparatus according to the embodiment (5), will be explained with reference to a flowchart shown in FIG. 10. First, it is decided whether or not a flag $f_1$ indicating that a person who comes close to the vehicle is present is set to 1 (step S61). If it is decided that the flag $f_3$ is not set to 1, it is decided based on the signal supplied from the person approaching detector 32 whether or not a person who comes close to the vehicle is detected (step S62). If it is decided that the person who comes close to the vehicle is detected, it is decided whether or not the arming mode is being set (step S63). In contrast, if it is decided that the person who comes close to the vehicle is present, the processing operation (5) is ended.

If it is decided by the decision in step S63 that the arming mode is being set, the flag $f_3$ is set to 1 (step S64). Then, a timer t is started (step S65). Then, the warning unit 33 is controlled to sound the warning buzzer (step S66). Then, it is decided by the timer t whether or not a predetermined time $t_2$ (e.g., 10 second) has lapsed (step S67). In contrast, if it is decided that the arming mode is not being set, the processing operation (5) is ended.

In the decision in step S67, if it is decided by the timer t that the predetermined time $t_2$ has lapsed, it is judged that the person who comes close to the vehicle enters into the compartment and then such person sits on the driver's seat or the passenger seat. Thus, the driving unit 29 is controlled to inject a large volume of steam (or cold air) (step S68).

Then, the mobile phone 30 is caused to inform the police of the intrusion (step S69). Then, the flag $f_3$ is reset to 0 (step S70).

By the way, in the decision process in step S67, if it is decided by the timer t that the predetermined time $t_2$ has not lapsed, it is decided based on the signal supplied from the person approaching detector 32 whether or not the person who came close to the vehicle has left the vehicle (step S71) If it is decided that the corner has left the vehicle, there is no need to inject a large volume of steam (or cold air). Thus, the flag $f_3$ is reset to 0 (step S70). In contrast, if it is decided that the person who comes close to the vehicle has not left the vehicle, the processing operation (5) is ended.

Also, if it is decided in the decision process in step S61 that the flag $f_1$ is set to 1, the person who comes close to the vehicle has already been detected and also the warning buzzer has already been sounded. Thus, steps S62 to S66 are skipped and the process goes to step S67.

According to the antitheft apparatus according to the above embodiment (5), in the situation that the arming mode is being set, when the predetermined time $t_2$ (e.g., a time required until the person who is going to commit the vehicle robbery sits on the driver's seat or the passenger seat after he or she comes close to the vehicle) has lapsed after the person who is going to intrude into the compartment (e.g., the person who comes close to the vehicle) is sensed, a large quantity of steam (or cold air) is injected into the compartment to obstruct the view of the intruder. Thus, it is possible to repel the intruder away.

More particularly, since the view of the intruder is obstructed or the intruder is surprised by injecting a large quantity of steam (or cold air) into the compartment at the proper time when the person who is going to commit the vehicle robbery sits on the drivers seat or the passenger seat, either the motion of the intruder can be confined or the intruder can be repelled away from the vehicle. Thus, the antitheft apparatus, which is improved in security performance, can be implemented. In addition, since not only is the motion of the intruder confined by the gas but also the informing operation to the outside (e.g., the police) is carried out, it is possible to capture the intruder quickly.

Figure 11:
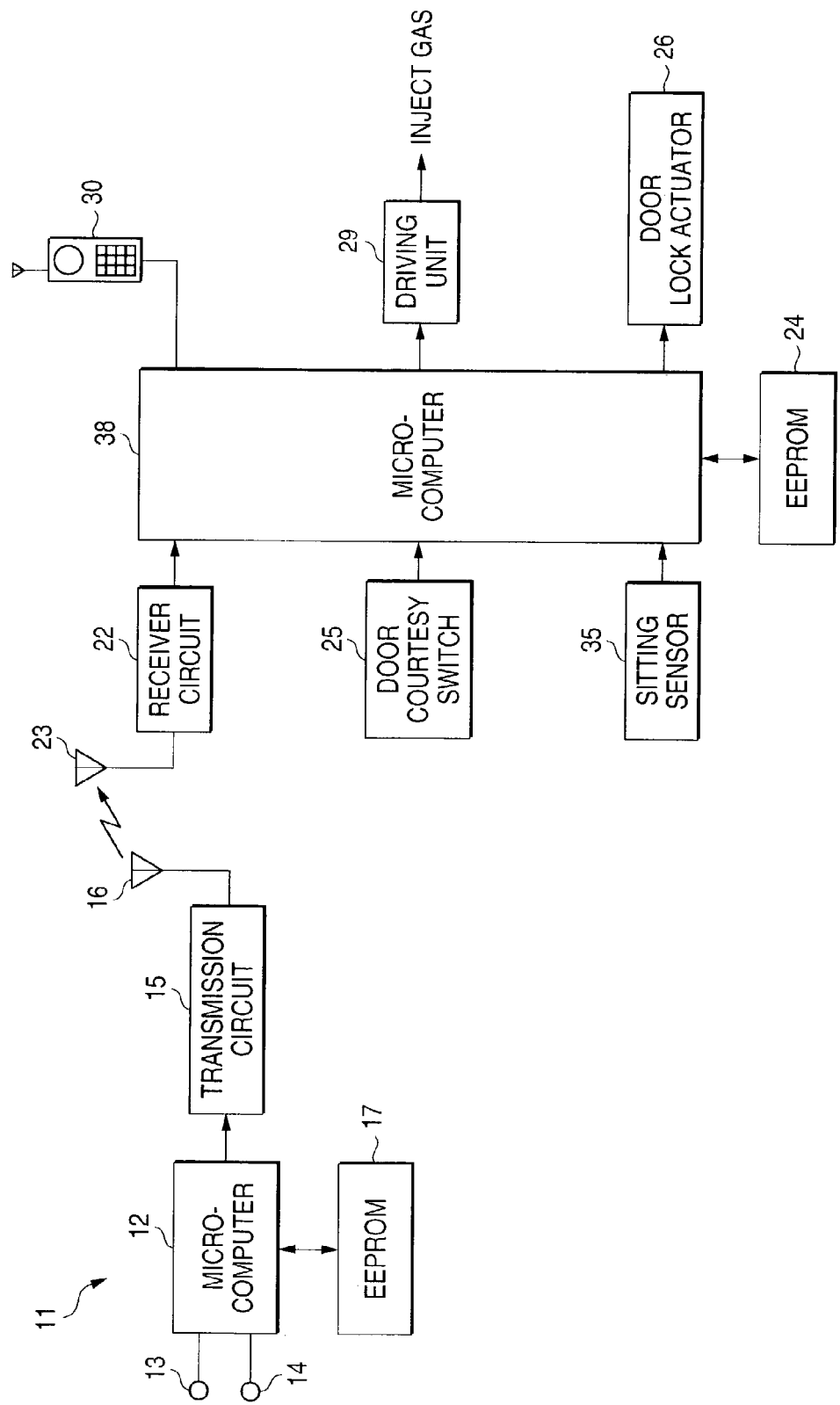
FIG. 11 is a block diagram showing schematically main portions of an antitheft system, which utilizes an antitheft apparatus according to an embodiment (6) of the invention.

FIG. 11 is a block diagram showing schematically main portions of an antitheft system that utilizes an antitheft apparatus according to an embodiment (6) of the invention. In this case, same numerals are allotted to constituent portions similar to those of the antitheft system shown in FIG. 1, and thus their explanation will be omitted herein.

A microcomputer 38 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 37 performs a process in response to the door lock command code contained in the above signal and the signal supplied from the door courtesy switch 25, which detects the open/close state of the door.

Also, the microcomputer 38 receives the signal supplied from the sitting sensor 35, which detects sitting on the driver's seat or the passenger seat. The microcomputer 38 controls the driving unit 29 and the mobile phone 30 based on the signal supplied from the sitting sensor 35. In this case, a method of detecting the intruder by the weight sensor built in the driver's seat or the like may be listed as the sitting sensor 35.

Next, a processing operation (6) executed by the microcomputer 38 in the antitheft system, which employs the antitheft apparatus according to the embodiment (6), will be explained with reference to a flowchart shown in FIG. 12. First, it is decided based on the signal supplied from the sitting sensor 35 whether or not the sitting on the driver's seat or the passenger seat is detected (step S81). If it is decided that the sitting is detected, it is decided whether or not the arming mode is being set (step S82). In contrast, if it is decided that the sitting is not sensed, the processing operation (6) is ended.

If it is decided by the decision in step S82 that the arming mode is being set, it is judged that a person who is sitting on the driver's seat or the passenger seat is an intruder into the compartment (i.e., a person who is not the normal user). Thus, the driving unit 29 is controlled so that a large volume of steam (or cold air) is injected (step S83). In addition, the mobile phone 30 is caused to inform the police of the intrusion (step S84). In contrast, if it is decided that the arming mode is not being set, it is judged that the person who is sitting on the driver's seat or the passenger seat is the normal user. Therefore, since there is no necessity to inject the steam (or cold air), the processing operation (6) is ended.

According to the antitheft apparatus according to the above embodiment (6), in the situation that the arming mode is being set, when the sitting on the driver's seat or the passenger seat is detected, either the view of the intruder is obstructed or the intruder is surprised by injecting a large quantity of steam (or cold air) into the compartment. Therefore, the motion of the intruder can be confined or the intruder can be repelled away from the vehicle. In addition, since not only is the motion of the intruder confined by the gas but also the informing operation to the outside (e.g., the police) is carried out, it is possible to capture the intruder quickly.

Figure 13:
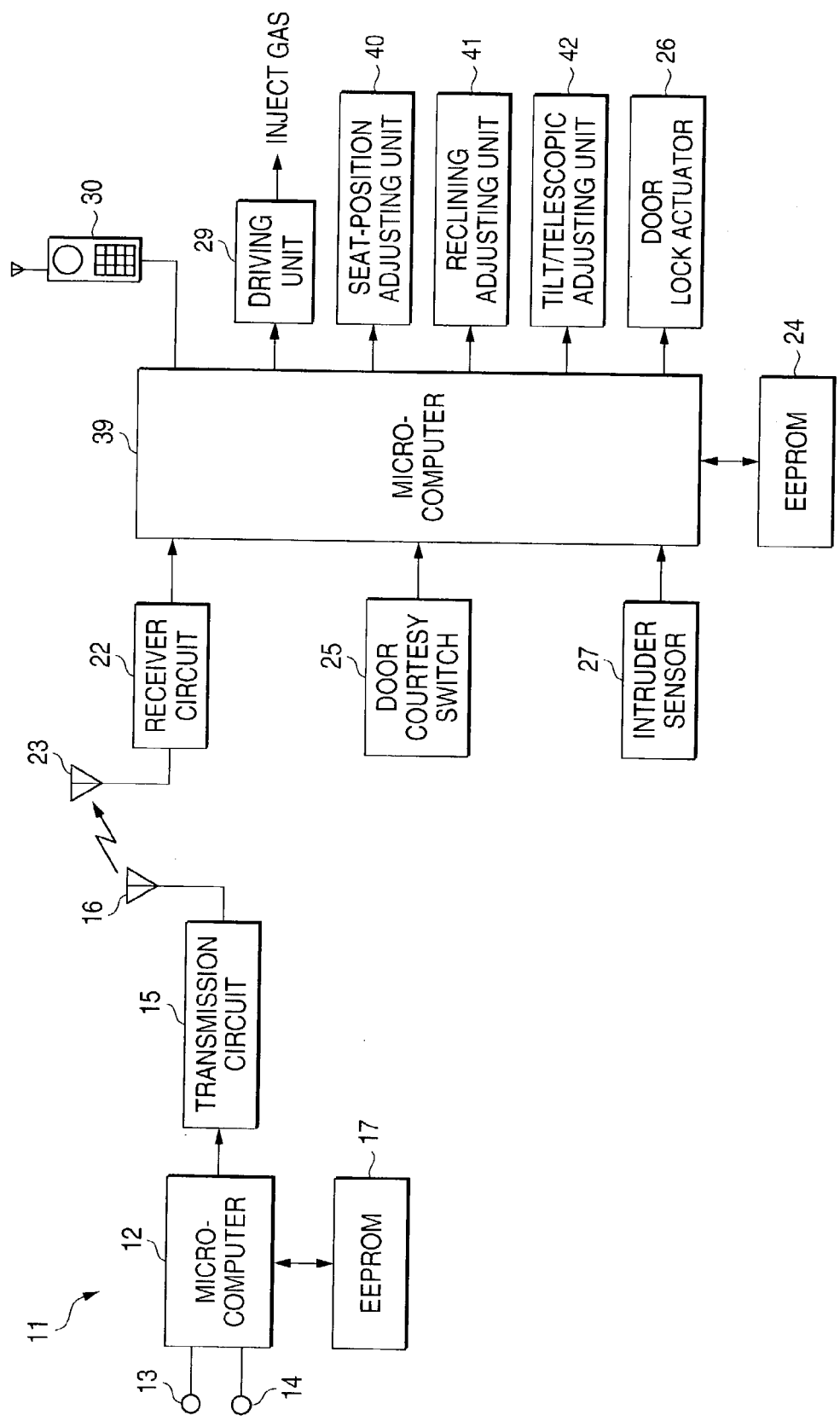
FIG. 13 is a block diagram showing schematically main portions of an antitheft system, which utilizes an antitheft apparatus according to an embodiment (7) of the invention.

FIG. 13 is a block diagram showing schematically main portions of an antitheft system that utilizes an antitheft apparatus according to an embodiment (7) of the invention. In this case, same numerals are allotted to constituent portions similar to those of the antitheft system shown in FIG. 1, and thus their explanation will be omitted herein.

A microcomputer 39 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 37 performs a process in response to the door lock command code contained in the above signal and the signal supplied from the door courtesy switch 25, which detects the open/close state of the door.

Also, in the situation that the arming mode is being set, the microcomputer 39 receives the signal supplied from the intruder sensor 27, which detects an intruder who enters into the compartment. The microcomputer 39 controls the driving unit 29, the mobile phone 30, a seat-position adjusting unit 40, a reclining adjusting unit 41, and a tilt/telescopic adjusting unit 42 based on the received signal. In this case, a method of detecting the motion of a person who enters into the compartment by using the ultrasonic wave, etc. maybe listed as the intruder sensor 27.

The seat-position adjusting unit 40 slides/moves a seat in the back-and-forth direction. The reclining adjusting unit 41 adjusts a reclining angle of the back portion of the seat. The tilt/telescopic adjusting unit 42 adjusts an angle and a length of the steering wheel (i.e., a distance to a person who is sitting on the driver's seat).

Figure 14:
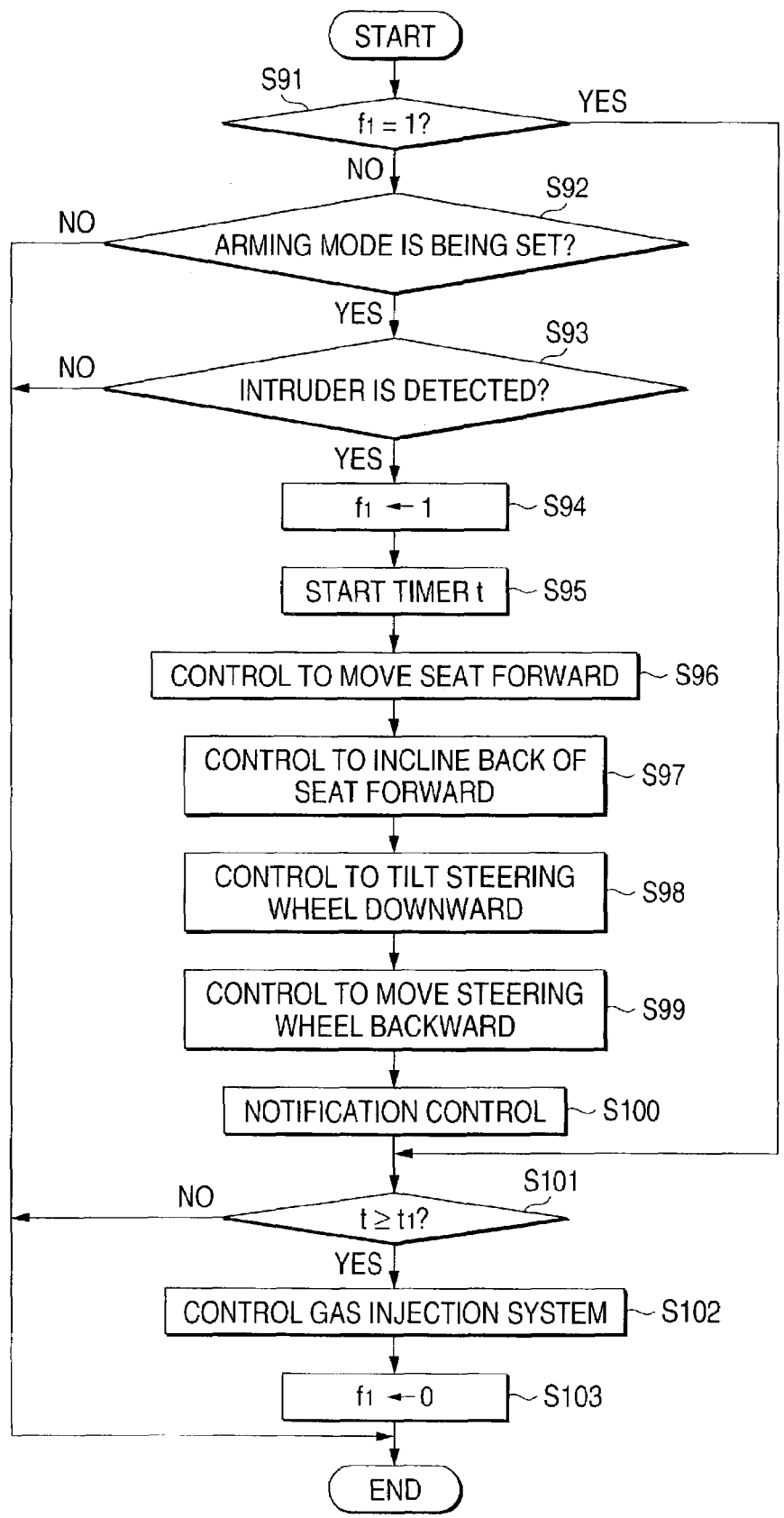
FIG. 14 is a flowchart showing processing operations executed by the microcomputer in the antitheft system, which utilizes the antitheft apparatus according to the embodiment (7).

Next, a processing operation (7) executed by the microcomputer 39 in the antitheft system, which employs the antitheft apparatus according to the embodiment (7), will be explained with reference to a flowchart shown in FIG. 14. First, it is decided whether or not the flag $f_1$ indicating that the intruder is present in the compartment is set to 1 (step S91) If it is decided that the flag $f_1$ is not set to 1, it is decided whether or not the arming mode is being set (step S92). If it is decided that the arming mode is being set, it is decided based on the signal supplied from the intruder sensor 27 whether or not the intruder is present in the compartment (step S93). In contrast, if it is decided that the arming mode is not being set, the processing operation (7) is ended.

Figure 15:
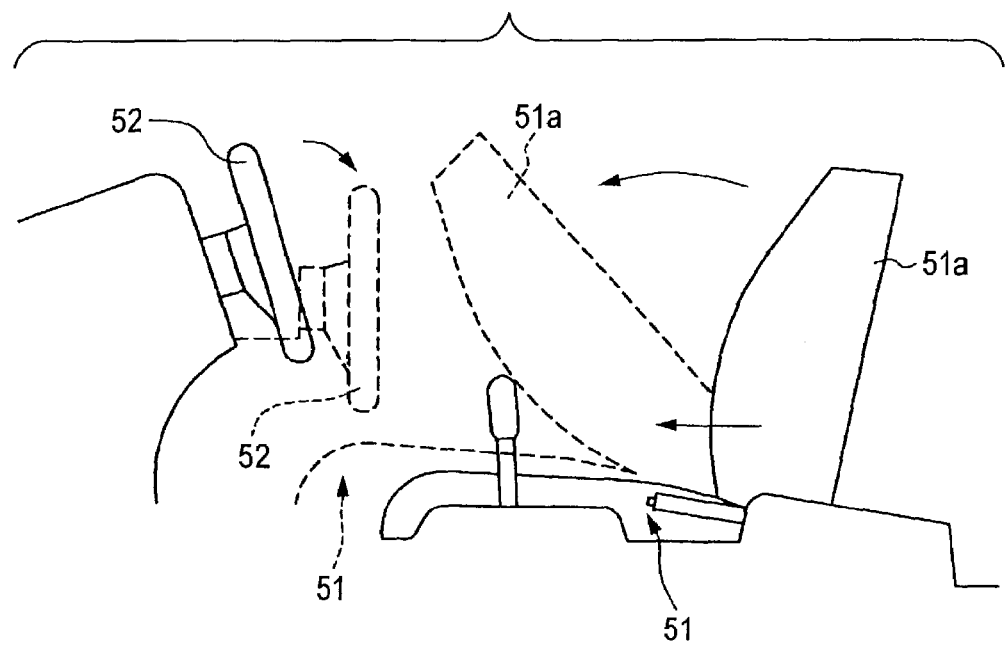
FIG. 15 is a schematically explanatory view explaining processes of changing positions of a seat and a steering wheel, in the antitheft system, which utilizes the antitheft apparatus according to the embodiment (7).

If it is decided in the decision in step S93 that the intruder is present in the compartment, the flag $f_1$ is set to 1 (step S94). Then, a timer t is started (step S95). Then, as shown in FIG. 15, the seat-position adjusting unit 40 is controlled to slide/move a seat 51 forward so that the seat 51 comes most closely to a steering wheel 52 (step S96). Also, the reclining adjusting unit 41 is controlled to incline a back portion 51a of the seat 51 to the mostly forward side (step S97). Also, the tilt/telescopic adjusting unit 42 is controlled to tilt the steering wheel 52 to the lowest side and to shorten a distance to the seat 51 (steps S98, S99).

In addition, the mobile phone 30 is caused to inform the police of the intrusion (step S100). Then, the process goes to step S101. In contrast, if it is decided in the decision process in step S93 that the intruder is not present in the compartment, there is no necessity to change the position of the seat 51 and others. Therefore, the processing operation (7) is ended.

In step S101, it is decided by the timer t whether or not the predetermined time $t_1$ (e.g., 20 second) has lapsed (step S101). If it is decided by the timer t that the predetermined time $t_1$ has lapsed, i.e., the predetermined time $t_1$ has lapsed after adjustment of the position of the seat 51 is started, the driving unit 29 is controlled so that a large quantity of steam (or cold air) is injected (step S102). Then, the flag $f_1$ is reset to 0 (step S103). In contrast, if it is decided by the timer t that the predetermined time $t_1$ has not lapsed, the processing operation (7) is ended.

Meanwhile, if it is decided in the decision process in step S91 that the flag $f_1$ is set to 1, positions of the seat 51 and the steering wheel 52 have already been changed and also the police has already been informed. Thus, steps S92 to S100 are skipped and the process goes to step S101.

According to the antitheft apparatus according to the above embodiment (7), if the intruder in the compartment is detected, the motion of the intruder can be confined by sliding/moving the seat 51 forward, inclining the back portion 51a to the forward side, tilting the steering wheel 52 to the downward side, and shortening the distance to the seat 51. Thus, the intruder can be captured. Therefore, the antitheft apparatus, which is improved in security performance, can be implemented.

Also, not only are the positions of the seat 51 and the steering wheel 52 changed but also a large quantity of steam (or cold air) is injected into the compartment. Therefore, even if changing the positions of the seat 51 could not confine the motion of the intruder, it is possible to repel the intruder away by the gas. In addition, since not only is the motion of the intruder confined by the change of seat position, etc. and by the gas but also the informing operation to the outside (e.g., the police) is carried out, it is possible to capture the intruder quickly.

Figure 16:
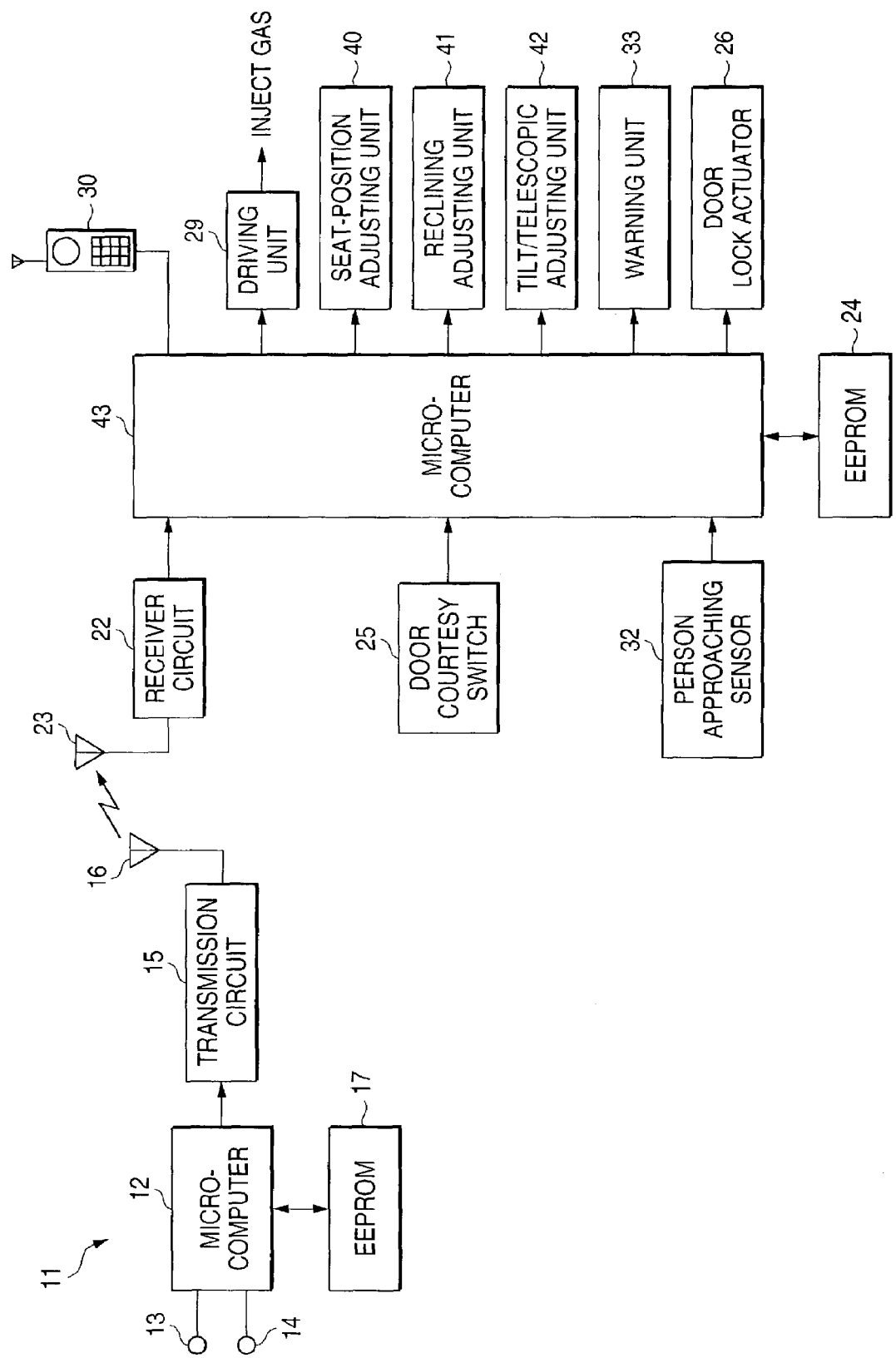
FIG. 16 is a block diagram showing schematically main portions of an antitheft system, which utilizes an antitheft apparatus according to an embodiment (8) of the invention.

FIG. 16 is a block diagram showing schematically main portions of an antitheft system that utilizes an antitheft apparatus according to an embodiment (8) of the invention. In this case, same numerals are allotted to constituent portions similar to those of the antitheft system shown in FIG. 13, and thus their explanation will be omitted herein.

A microcomputer 43 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 43 performs a process in response to the door lock command code contained in the above signal and the signal supplied from the door courtesy switch 25, which detects the open/close state of the door.

Also, the microcomputer 43 receives the signal supplied from the person approaching detector 32, which detects a person who is going to intrude into the compartment (here, a person who comes close to the vehicle). The microcomputer 43 controls the driving unit 29, the mobile phone 30, the warning unit 33, the seat-position adjusting unit 40, the reclining adjusting unit 41, and the tilt/telescopic adjusting unit 42 based on the signal supplied from the person approaching detector 32. In this case, a method of detecting motion of a person who comes close to the vehicle by using the ultrasonic wave, etc. may be listed as the person approaching detector 32.

Figure 17:
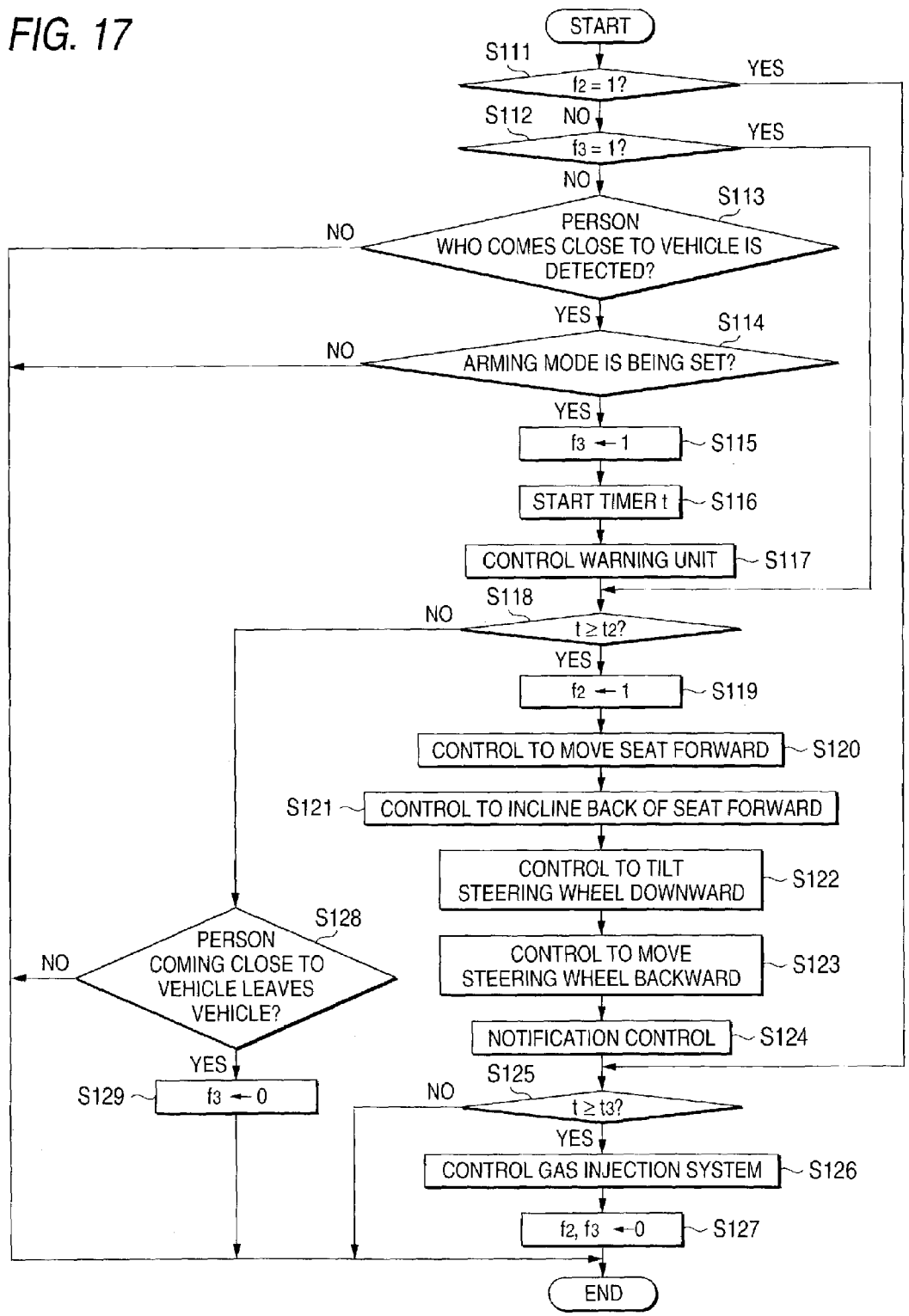
FIG. 17 is a flowchart showing processing operations executed by the microcomputer in the antitheft system, which utilizes the antitheft apparatus according to the embodiment (8).

Next, a processing operation (8) executed by the microcomputer 43 in the antitheft system, which employs the antitheft apparatus according to the embodiment (8), will be explained with reference to a flowchart shown in FIG. 17. First, it is decided whether or not a flag $f_2$ indicating that an intruder is deemed to be present in the compartment (see step S119 described later) is set to 1 (step S111) If it is decided that the flag $f_2$ is not set to 1, it is decided whether or not a flag $f_3$ indicating that a person who comes close to the vehicle is present is set to 1 (step S112).

If it is decided that the flag $f_3$ is not set to 1, it is decided based on the signal supplied from the person approaching detector 32 whether or not a person who comes close a person who comes close to the vehicle is detected, it is decided whether or not the arming mode is being set (step S114) In contrast, if it is decided that a person who comes close to the vehicle is not present, the processing operation (8) is ended.

If it is decided by the decision in step S114 that the arming mode is being set, the flag $f_3$ is set to 1 (step S115). Then, a timer t is started (step S116). Then, the warning unit 33 is controlled to sound the warning buzzer (step S117). Then, it is decided by the timer t whether or not the predetermined time $t_2$ (e.g., 10 second) has lapsed (step S118). In contrast, if it is decided that the arming mode is not being set in step S114, the processing operation (8) is ended.

In decision in step S118, if it is decided by the timer t that the predetermined time $t_2$ has lapsed, it is judged that a person who comes close to the vehicle intrudes into the compartment and then such person sits on the driver's seat or the passenger seat. Thus, the flag $f_2$ is set to 1 (step S119). Then, as shown in FIG. 15, the seat-position adjusting unit 40 is controlled to slide/move the seat 51 forward so that the seat 51 comes closest to the steering wheel 52 (step S120). Also, the reclining adjusting unit 41 is controlled to incline the back portion 51a of the seat 51 to the mostly front side (step S121). Also, the tilt/telescopic adjusting unit 42 is controlled to tilt the steering wheel 52 to the mostly downward side and to shorten the distance to the seat 51 (steps S122, S123). Then, the mobile phone 30 is caused to inform the police of the intrusion (step S124). Then, the process goes to step S125.

In step S125, it is decided by the timer t whether or not the predetermined time $t_3$ (e.g., 30 second) has lapsed (step S125). If it is decided by the timer t that the predetermined time $t_3$ has lapsed, i.e., the predetermined time $t_1$ has lapsed after adjustment of the seat position is started, the driving unit 29 is controlled to inject a large volume of steam (or cold air) (step S126). Then, the flags $f_2$, $f_3$ are reset to 0 (step S127). In contrast, it is decided by the timer t that the predetermined time $t_3$ has not lapsed, the processing operation (8) is ended.

By the way, in the decision process in step S118, if it is decided by the timer t that the predetermined time $t_2$ has not lapsed, it is decided based on the signal supplied from the person approaching detector 32 whether or not the person who came close to the vehicle has left the vehicle (step S128). If it is decided that the person coming close to the vehicle has left the vehicle, there is no need to change the position of the seat, etc. Thus, the flag $f_3$ is reset to 0 (step S129). In contrast, if it is decided that the person coming close to the vehicle has not left the vehicle, the processing operation (8) is ended.

Also, if it is decided in the decision process in step S112 that the flag $f_3$ is set to 1, the person who comes close to the vehicle has already been detected and also the warning buzzer has already been sounded. Thus, steps S113 to S117 are skipped and the process goes to step S118. Similarly, if it is decided in the decision process in step S111 that the flag $f_2$ is set to 1, the positions of the seat and the steering wheel have already been changed and also the police has already been informed. Thus, steps S112 to S124 are skipped and the process goes to step S125.

According to the antitheft apparatus according to the above embodiment (8), in the situation that the arming mode is being set, when the predetermined time $t_2$ (e.g., a time required until the person who is going to commit the vehicle robbery sits on the driver's seat or the passenger seat after he or she comes close to the vehicle) has lapsed after the person who is going to intrude into the compartment (e.g., the person who comes close to the vehicle) is detected, the motion of the intruder can be confined by sliding/moving the seat 51 forward, inclining the back portion 51a to the forward side, tilting the steering wheel 52 to the downward side, and shortening the distance to the seat 51. Thus, the intruder can be captured.

In other words, since the motion of the intruder can be restricted by changing the positions of the seat 51 and the steering wheel 52 at a time when the per son who is going to commit the vehicle robbery sits on the drivers seat or the passenger seat, the intruder can be captured. Therefore, the antitheft apparatus, which is improved insecurity performance, can be implemented.

Also, not only are the positions of the seat 51 and the steering wheel 52 changed but also a large volume of steam (or cold air) is injected into the compartment. Therefore, even if changing the positions of the seat 51 could not restrict the intruder, it is possible to repel the intruder away by the gas. In addition, since not only is the motion of the intruder confined by the change of seat position, etc. and by the gas but also the informing operation to the outside (e.g., the police) is carried out, the intruder can be captured quickly.

Figure 18:
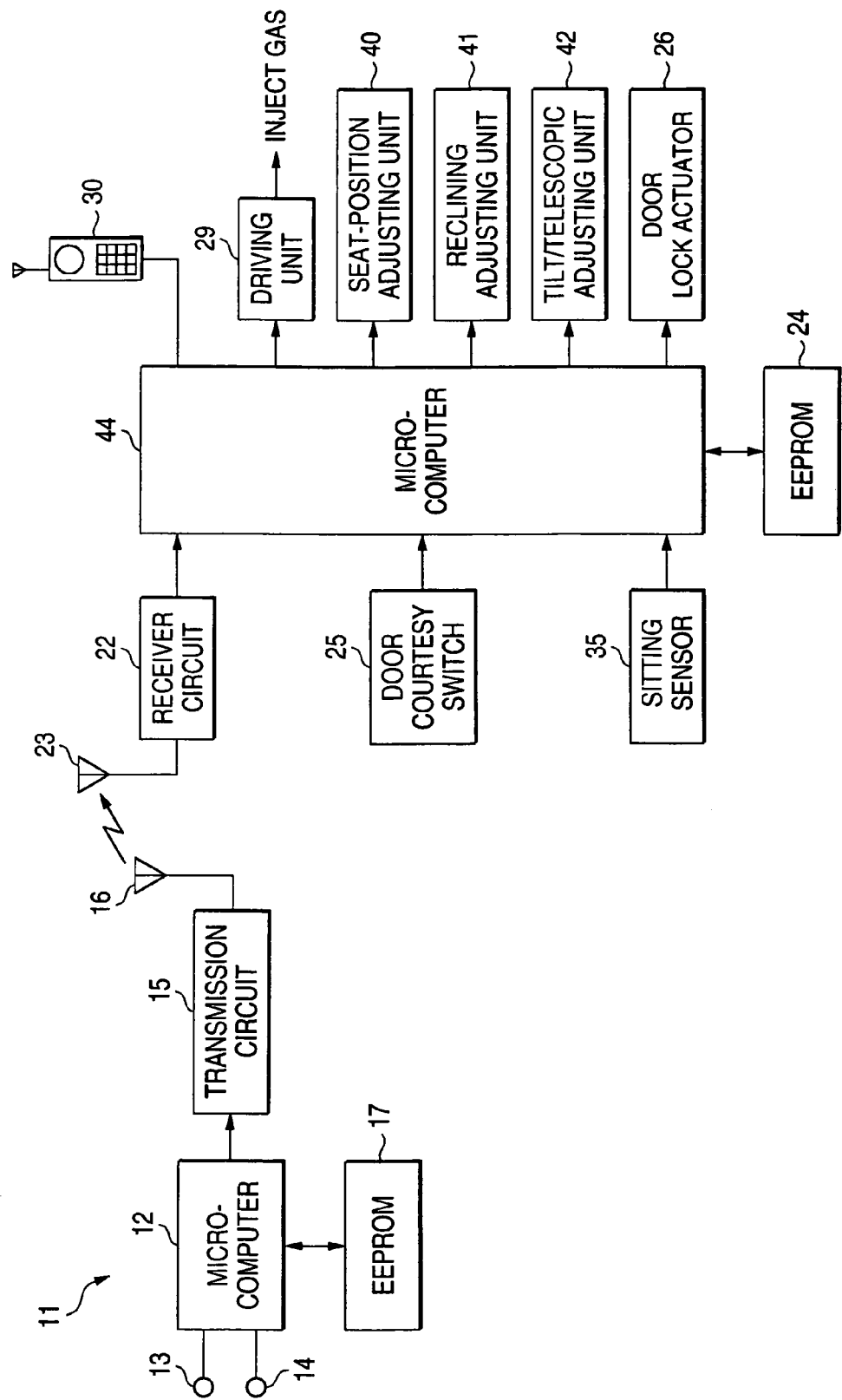
FIG. 18 is a block diagram showing schematically main portions of an antitheft system, which utilizes an antitheft apparatus according to an embodiment (9) of the invention.

FIG. 18 is a block diagram showing schematically main portions of an antitheft system, which utilizes an antitheft apparatus according to an embodiment (9) of the invention. In this case, same numerals are allotted to constituent portions similar to those of the antitheft system shown in FIG. 13, and thus their explanation will be omitted herein.

A microcomputer 44 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 44 performs a process in response to the door lock command code contained in the above signal and the signal supplied from the door courtesy switch 25, which detects the open/close state of the door.

Also, the microcomputer 44 receives the signal supplied from the sitting sensor 35, which detects sitting on the driver's seat or the passenger seat. The microcomputer 44 controls the driving unit 29, the mobile phone 30, the seat-position adjusting unit 40, the reclining adjusting unit 41, and the tilt/telescopic adjusting unit 42 based on the signal supplied from the sitting sensor 35. In this case, a method of detecting the sitting by using the weight sensor, which is built in the driver's seat or the like may be listed as the sitting sensor 35.

Next, a processing operation (9) executed by the microcomputer 44 in the antitheft system, which employs the antitheft apparatus according to the embodiment (9), will be explained with reference to a flowchart shown in FIG. 19. First, it is decided whether or not the flag $f_1$ indicating that the intruder is present in the compartment is set to 1 (step S131). If it is decided that the flag $f_1$ is not set to 1, it is decided based on the signal supplied from the sitting sensor 35 whether or not sitting on the driver's seat or the passenger seat is detected (step S132). If it is decided that the sitting is set (step S133). In contrast, if it is decided that the sitting is not detected, the processing operation (9) is ended.

If it is decided by the decision in step S133 that the arming mode is being set, it is judged that a person who sits on the driver's seat or the passenger seat is a person who intrudes into the compartment (i.e., a person who is not a normal user). Thus, the flag $f_1$ is set to 1 (step S134). Then, the timer t is started (step S135). Then, as shown in FIG. 15, the seat-position adjusting unit 40 is controlled to slide/move the seat 51 forward such that the seat 51 comes most closely to the steering wheel 52 (step S136). Also, the reclining adjusting unit 41 is controlled to incline the back portion 51a of the seat 51 to the mostly forward side (step S137). Also, the tilt/telescopic adjusting unit 42 is controlled to tilt the steering wheel 52 to the lowest side and to shorten a distance to the seat 51 (steps S138, S139).

In addition, the mobile phone 30 is caused to inform the police of the intrusion (step S140). Then, the process goes to step S141. In contrast, if it is decided that the arming mode is not being set, it is judged that a person who sits on the driver's seat or the passenger seat is a person who is a normal user. Thus, since there is no necessity to change the positions of the seat, etc., the processing operation (9) is ended.

In step S141, it is decided by the timer t whether or not the predetermined time $t_1$ (e.g., 10 second) has lapsed (step S141). If it is decided by the timer t that the predetermined time $t_1$ has lapsed, i.e., the predetermined time $t_1$ has lapsed after adjustment of the seat position is started, the driving unit 29 is controlled to inject a large quantity of steam (or cold air) (step S142). Then, the flag $f_1$ is reset to 0 (step S143). In contrast, if it is decided by the timer t that the predetermined time $t_1$ has not lapsed, the processing operation (9) is ended.

Meanwhile, if it is decided in the decision process in step S131 that the flag $f_1$ is set to 1, the positions of the seat and the steering wheel have already been changed and also the police has already been informed. Thus, steps S132 to S140 are skipped and the process goes to step S141.

According to the antitheft apparatus according to the above embodiment (9), in the situation that the arming mode is being set, if the sitting on the driver's seat or the passenger seat is detected, the motion of the intruder can be confined by sliding/moving the seat 51 forward, inclining the back portion 51a to the forward side, tilting the steering wheel 52 to the downward side, and shortening the distance to the seat 51, and thus the intruder can be captured. Therefore, the antitheft apparatus, which is improved in security performance, can be implemented. Also, since positions of the seat 51 and the steering wheel 52 are changed when the intruder sits on the driver's seat or the passenger seat, the intruder can be captured more surely.

Also, not only are the positions of the seat 51 and the steering wheel 52 changed but also a large quantity of steam (or cold air) is injected into the compartment. Therefore, even if the position changes of the seat 51 cannot confine the intruder, it is possible to run the intruder away by the gas. In addition, since not only is the motion of the intruder confined by the change of the seat position, etc. or by the gas but also the informing operation to the outside (e.g., the police) is carried out, the intruder can be captured quickly.

Also, in the antitheft apparatus according to any one of the above embodiments (7) to (9), if the intruder is present in the compartment or if the intruder sits on the driver's seat or the like, the positions of the seat 51 and the steering wheel 52 are changed or the gas is injected. However, in the antitheft apparatus according to another embodiment, ejecting the material as the source of foam polystyrene into the space around the seat 51 and injecting the steam to the material or expanding the air bag, or the like may be employed in combination with these security functions.

Also, in the antitheft apparatus according to still another embodiment, a selector switch may be connected to the microcomputers 21, 31, 34, 36 to 39, 43, 44 respectively to make it possible for the user to select/set whether or not the above security functions should be operated. Accordingly, the system that is very convenient for the user to use can be obtained.

In addition, in the antitheft apparatus according to yet still another embodiment, at least two functions of these security functions may be combined mutually and then a utilized function may be selected/set arbitrarily from these plural installed functions by the user.

Figure 20:
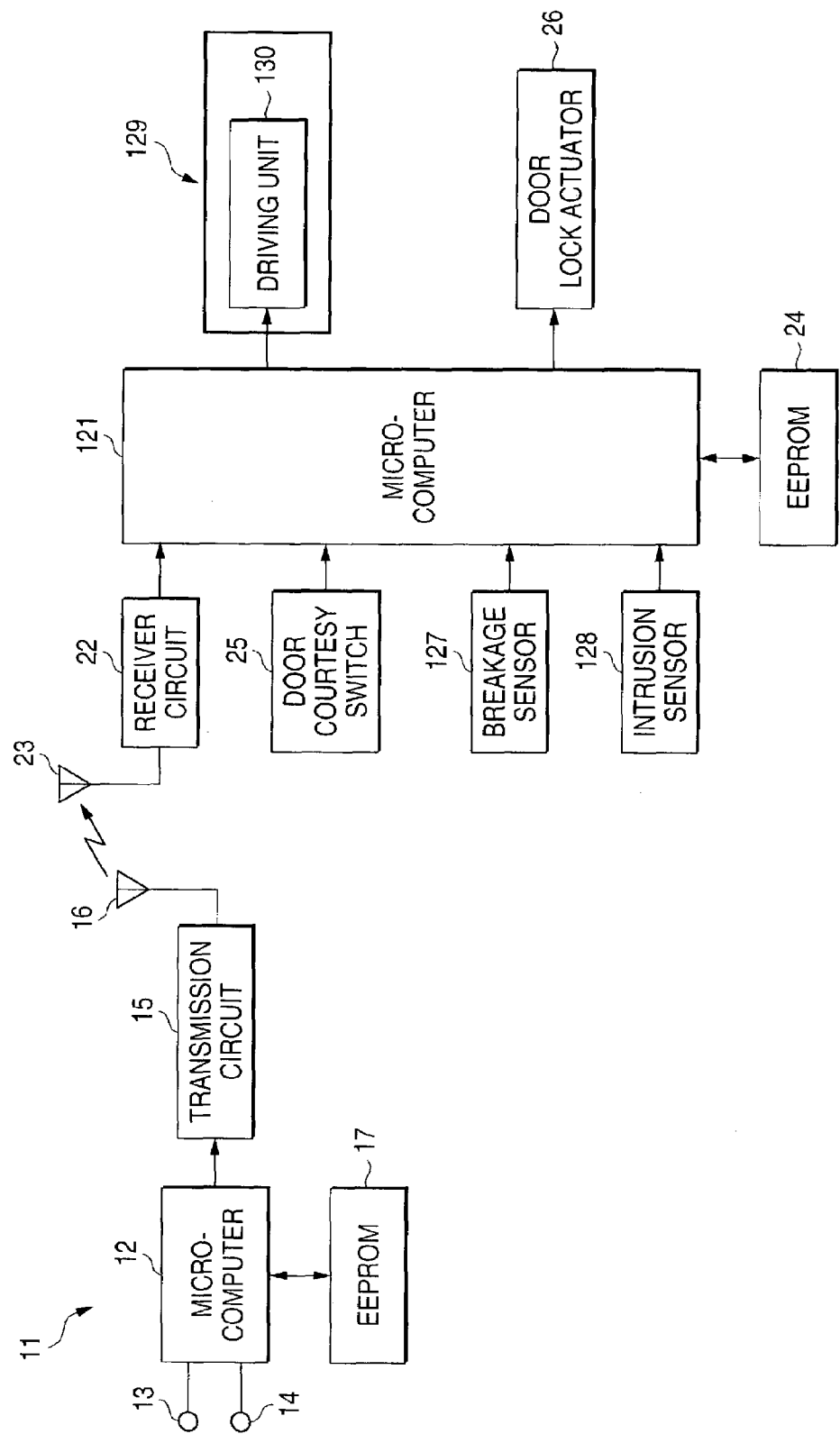
FIG. 20 is a block diagram showing schematically main portions of an antitheft system, which employs an antitheft apparatus according to an embodiment (10) of the invention.

FIG. 20 is a block diagram showing schematically main portions of an antitheft system, which employs an antitheft apparatus according to an embodiment (10) of the invention. In this case, same numerals are allotted to constituent portions similar to those of the antitheft system shown in FIG. 1, and thus their explanation will be omitted herein.

A microcomputer 122 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 122 performs a process in response to the door lock command code contained in the above signal and the signal supplied from the door courtesy switch 25, which detects the open/close state of the door.

Also, in the situation that the arming roue is being set, the microcomputer 122 receives a signal supplied from a breakage sensor 127, which detects the fact that a window glass is broken, and a signal supplied from an intrusion sensor 128, which detects an invalid intrusion into the vehicle.

Then, the microcomputer 122 controls, based on the received signal, a driving unit 130 of a capturing system 129, which winds wire arranged round a window frame to capture a part of body of the intruder such as a hand of the intruder, which enters through the window whose window glass is broken.

In this case, a method of detecting a vibration generated when the window glass is broken may be listed as the breakage sensor 127. Also, a method of detecting a motion of the hand of the intruder, which enters into the vehicle by using the ultraviolet wave, etc. may be listed as the intrusion sensor 128.

Figure 21:
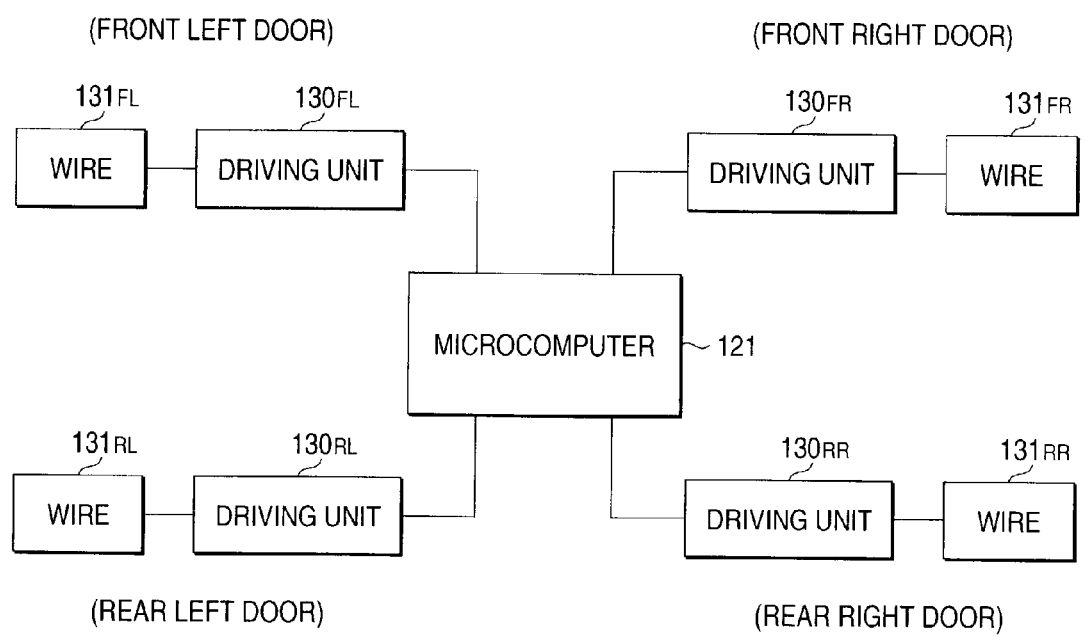
FIG. 21 is a view showing relationships among a microcomputer, driving units, and wires in the antitheft apparatus according to the embodiment (10).

Also, as shown in FIG. 21, the capturing system 129 includes wires $131_{FR}, \ldots$, which are wound round window frames of four doors (front right door, front left door, rear right door, rear left door) respectively, and driving units $130_{FR}, \ldots$, which wind the wires $131_{FR}, \ldots$, respectively. In this case, the wires 131 are wound round respective window frames in such a manner that each of the wires cannot be wound unless each window glass is broken.

Figure 22:
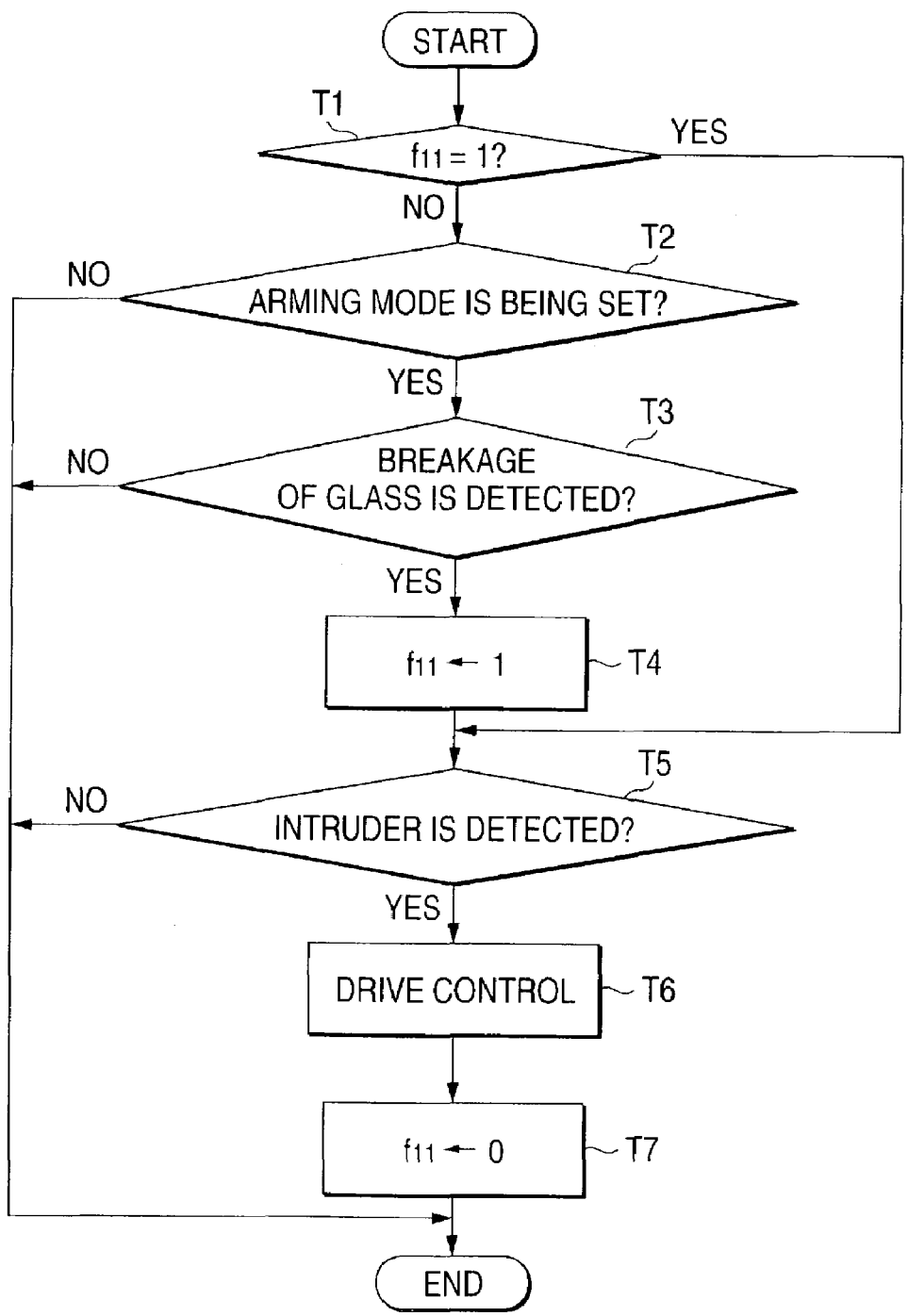
FIG. 22 is a flowchart showing processing operations executed by the microcomputer in the antitheft system, which employs the antitheft apparatus according to the embodiment (10).

Next, a processing operations (10) executed by the microcomputer 121 in the antitheft system, which employs the antitheft apparatus according to the embodiment (10), will be explained with reference to a flowchart shown in FIG. 22. First, it is decided whether or not a flag $f_{11}$ indicating that the window glass is broken is set to 1 (step T1). Then, if it is decided that the flag $f_{11}$ is not set to 1 (i.e., the window glass is not broken), it is decided whether or not the arming mode is being set (step T2).

Here, if it is decided that the arming mode is being set, it is decided based on the signal supplied from the breakage sensor 127 whether or not the window glass is broken (step T3). If it is decided that the window glass is broken, the flag $f_{11}$ is set to 1 (step T4). Then, it is decided based on the signal supplied from the intrusion sensor 128 whether or not the invalid intrusion into the vehicle is detected (i.e., the hand or the like has entered through the window whose window glass is broken) (step T5).

Then, if it is decided that the hand or the like has entered through the window whose window glass is broken, the driving units $130_{FR}, \ldots$ are controlled so that the wires $131_{FR}, \ldots$ that are wound round the window frames are wound to catch the entering hand, etc. (step T6). Then, the flag $f_{11}$ is reset to 0 (step T7).

Also, if it is decided in step T2 that the arming mode is not being set, or if it is decided in step T3 that the window glass is not broken, or it is decided in step T5 that the hand, or the like has not entered into the vehicle, the processing operation (10) is ended.

Also, if it is decided in step T1 that the flag $f_{11}$ is set to 1, the breakage of the window glass has already been detected. Thus, steps T2 to T4 are skipped and the process goes to step T5.

According to the antitheft system, which employs the antitheft apparatus according to the above embodiment (10), if the hand or the like enters through the window whose window glass is broken, the body of the intruder, e.g., the entering hand or the like can be captured by using the capturing system 129. Therefore, the antitheft system, which is improved in security performance, can be implemented.

Accordingly, if a person who is going to commit the vehicle robbery (i.e., the intruder) breaks the window glass, then inserts the hand through the window whose window glass is broken, and then tries to release the door lock, for example, the intruder can be bound by capturing the hand inserted through the window.

Figure 23:
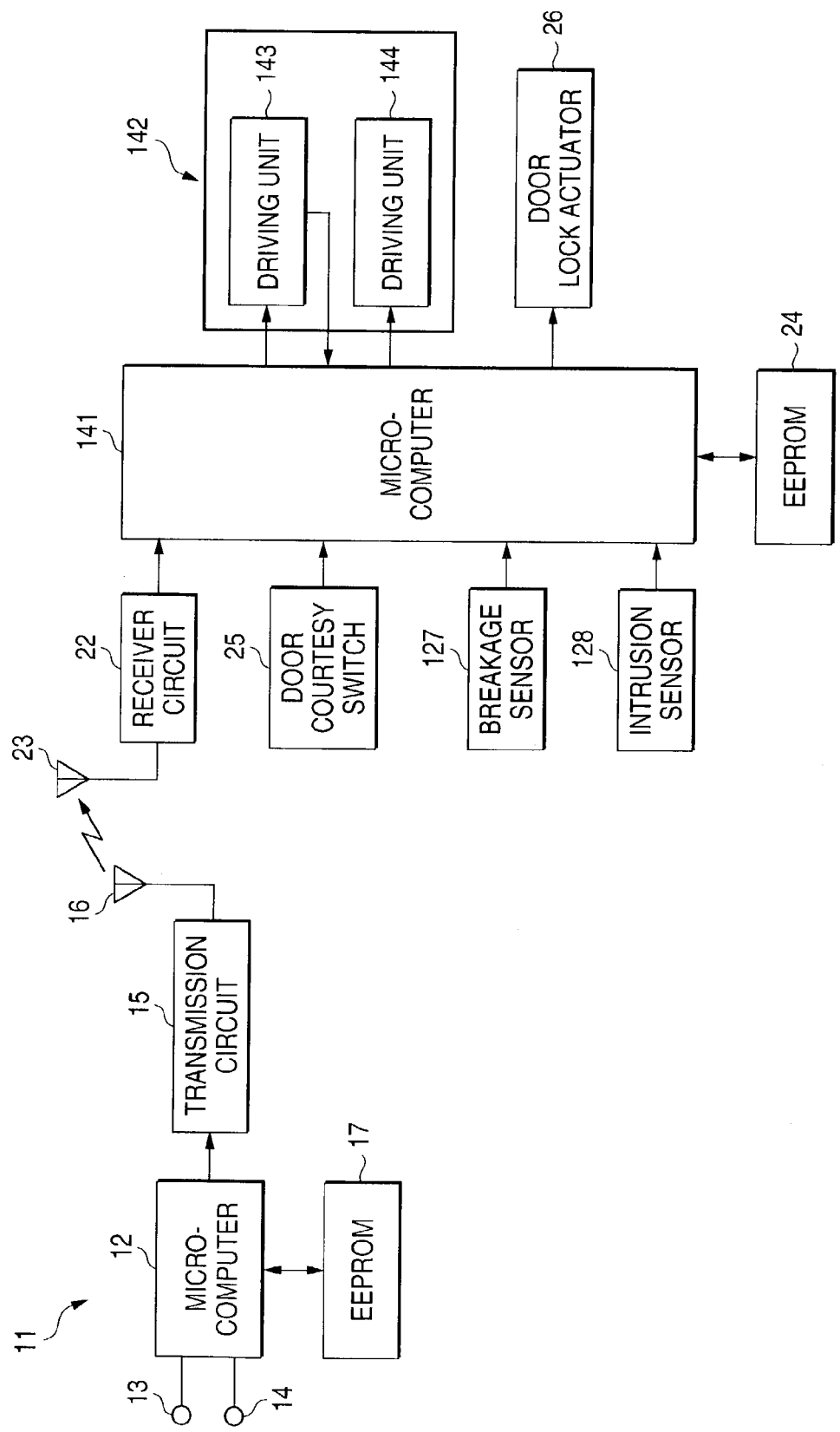
FIG. 23 is a block diagram showing schematically main portions of an antitheft system, which employs an antitheft apparatus according to an embodiment (11) of the invention.

FIG. 23 is a block diagram showing schematically main portions of an antitheft system, which employs an antitheft apparatus according to an embodiment (11) of the invention. In this case, same numerals are allotted to constituent portions similar to those of the antitheft system shown in FIG. 20, and thus their explanation will be omitted herein.

A microcomputer 141 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 141 performs a process in response to the door lock command code contained in the above signal and the signal supplied from the door courtesy switch 25, which detects the open/close state of the door.

Also, in the situation that the arming mode is being set, the microcomputer 141 receives the signal supplied from the breakage sensor 127, which detects the fact that the window glass is broken, and the signal supplied from the intrusion sensor 128, which detects the invalid intrusion into the vehicle. Then, the microcomputer 141 controls, based on the received signals, driving units 143, 144 of a capturing system 142, which winds wire arranged around window frames to capture a part of a body of the intruder such as a hand of the intruder, which enters through the window whose window glass is broken.

Figure 24:
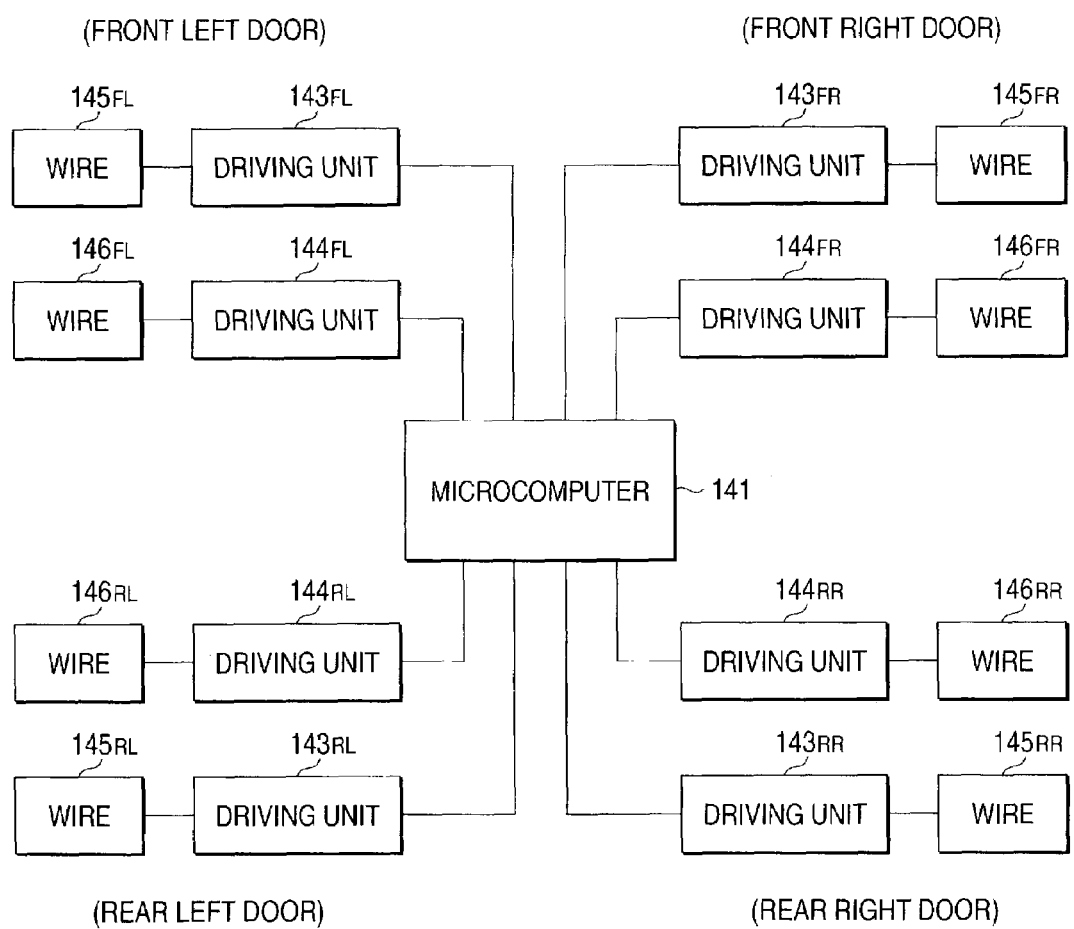
FIG. 24 is a view showing relationships among the microcomputer, the driving units, and the wires in the antitheft apparatus according to the embodiment (11).

Also, as shown in FIG. 24, the capturing system 142 includes first-stage wires $145_{FR}, \ldots$, which are wound round window frames of four doors (front right door, front left door, rear right door, rear left door), respectively, driving units $143_{FR}, \ldots$, which wind wires $145_{FR}, \ldots$, respectively, second-stage wires $146_{FR}, \ldots$, which are used when the intruder cannot be captured by winding the wires $145_{FR}, \ldots$, and driving units $144_{FR}, \ldots$, which wind the wires $146_{FR}, \ldots$, respectively. In this case, the wires 145, 146 are wound round respective window frames in such a manner that each of the wires cannot be wound unless each window glass is broken.

Also, the driving units 143 are constructed to not only wind the wires 145 but also transmit a reply signal indicating the winding state of the wires 145 to the microcomputer 141 under control of the microcomputer 141. As a result, since the microcomputer 141 can grasp the winding state of the wires 145, it can decide whether or not the intruder can be captured precisely.

For example, in comparison a case that the arm of the intruder is caught with a case that the arm of the intruder is not caught, an amount of winding in the former case should become smaller than that in the latter case. In other words, if the winding is carried out to exceed a predetermined value, it is decided that the capturing system 142 fails to capture the intruder.

Figure 25:
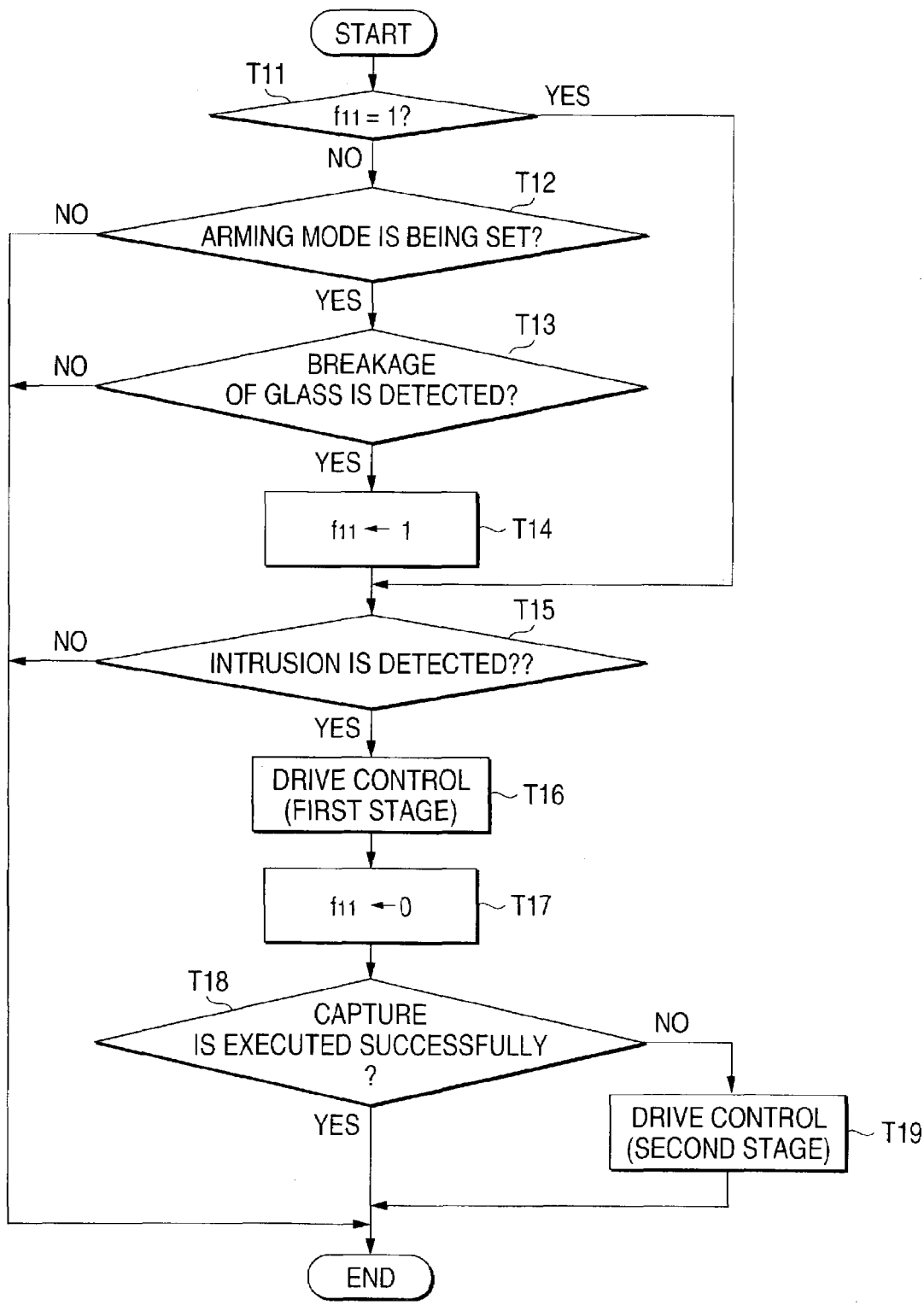
FIG. 25 is a flowchart showing processing operations executed by the microcomputer in the antitheft system, which employs the antitheft apparatus according to the embodiment (11).

Next, a processing operation (11) executed by the microcomputer 141 in the antitheft system, which employs the antitheft apparatus according to the embodiment (11), will be explained with reference to a flowchart shown in FIG. 25. First, it is decided whether or not the flag $f_{11}$ indicating that the window glass is broken is set to 1 (step T11). Then, if it is decided that the flag $f_{11}$ is not set to 1 (i.e., the window glass is not broken), it is decided whether or not the arming mode is being set (step T12).

Here, if it is decided that the arming mode is being set, it is decided based on the signal supplied from the breakage sensor 127 whether or not the window glass is broken (step T13) If it is decided that the window glass is broken, the flag $f_{11}$ is set to 1 (step T14). Then, it is decided based on the signal supplied from the intrusion sensor 128 whether or not the invalid intrusion into the vehicle is detected (i.e., the hand or the like enters through the window whose window glass is broken)(step T15).

Then, if it is decided that the hand or the like has entered through the window whose window glass is broken, the driving units $143_{FR}$, ... are controlled so that the first-stage wires $145_{FR}$, ..., which are arranged round the window frames, are wound to catch the inserted hand, etc. (step T16). Then, the flag $f_{11}$ is reset to 0 (step T17).

Then, if it is decided based on the signal, which is sent back from the driving units 143 to indicate the winding information, whether or not the capturing system 142 succeeds in the capture of the intruder (step T18). If it is decided that the capturing system 142 succeeds in the capture of the intruder, the processing operation (11) is ended. In contrast, if the capturing system 142 fails to capture the intruder, the driving units $144_{FR}$, ... are controlled to wind the second-stage wires $146_{FR}$, ... (step T19).

Also, if it is decided in step T12 that the arming mode is not being set, or if it is decided in step T13 that the window glass is not broken, or it is decided in step T15 that the hand or the like does not enter into the vehicle, the processing operation (11) is ended.

Also, if it is decided in step T11 that the flag $f_{11}$ is set to 1, the breakage of the window glass has already been sensed. Thus, steps T12 to T14 are skipped and the process goes to step T15.

According to the antitheft system, which employs the antitheft apparatus according to the above embodiment (11), if the hand or the like has entered through the window whose window glass is broken, the body of the intruder such as the entering hand can be captured by using the capturing system 142. Therefore, the antitheft system, which is improved in security performance, can be implemented.

Accordingly, if a person who is going to commit the vehicle robbery (i.e., an intruder) breaks the window glass, then enters the hand through the window whose door window glass is broken, and then tries to release the door lock, for example, the intruder can be bound by capturing the hand inserted through the window.

Also, according to the antitheft system, which employs the antitheft apparatus according to the above embodiment (11), even if the intruder could not been captured by winding the first-stage wires 145, the capture of the intruder is tried once again by using the second-stage wires 146. Therefore, the intruder can be captured more surely.

In this case, in the above antitheft system, two sets of devices for capturing the intruder are provided to the window respectively. However, in another antitheft system, such devices may be constructed so that they are reset to the initial state after they have tried once to capture the intruder, and then such devices may be reset to the initial state if the capturing system fails to capture the intruder. As a result, a set of devices may be provided to each window respectively, and thus cost reduction can be attained.

Figure 26:
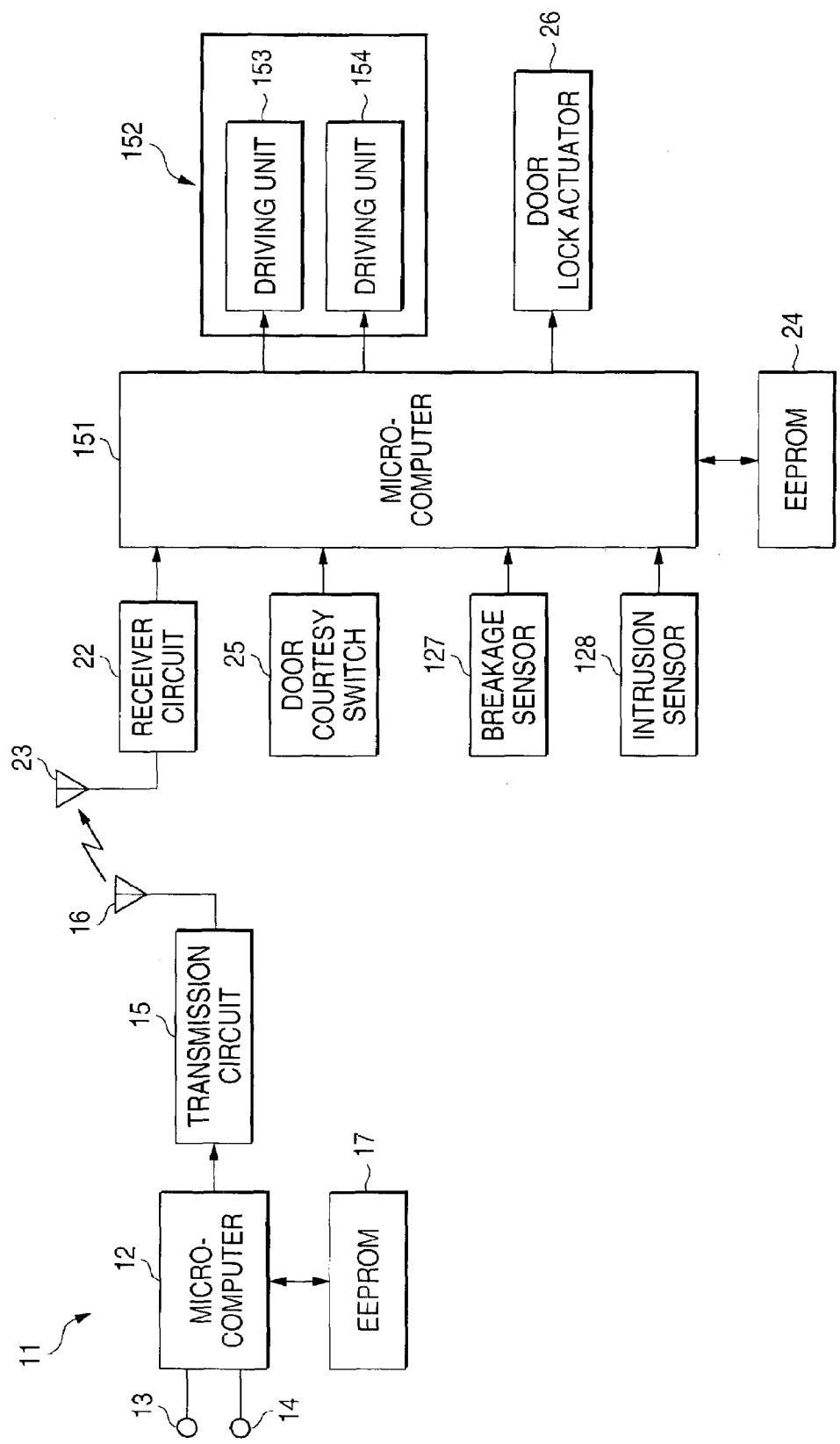
FIG. 26 is a block diagram showing schematically main portions of an antitheft system, which employs an antitheft apparatus according to an embodiment (12) of the invention.

FIG. 26 is a block diagram showing schematically main portions of an antitheft system that employs an antitheft apparatus according to an embodiment (12) of the invention. In this case, same numerals are allotted to constituent portions similar to those of the antitheft system shown in FIG. 20, and thus their explanation will be omitted herein.

A microcomputer 151 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 141 performs a process in response to the door lock command code contained in the above signal and the signal supplied from the door courtesy switch 25, which detects the open/close state of the door.

Also, in the situation that the arming mode is being set, the microcomputer 151 receives the signal supplied from the breakage sensor 127, which detects the fact that the window glass is broken, and the signal supplied from the intrusion sensor 128, which detects the invalid intrusion into the vehicle. Then, the microcomputer 151 controls, based on the received signals, driving units 153, 154 of a capturing system 152 that winds wires arranged round window frames to capture a part of a body of an intruder such as a hand of the intruder, which enters through the window whose window glass is broken.

Figure 27:
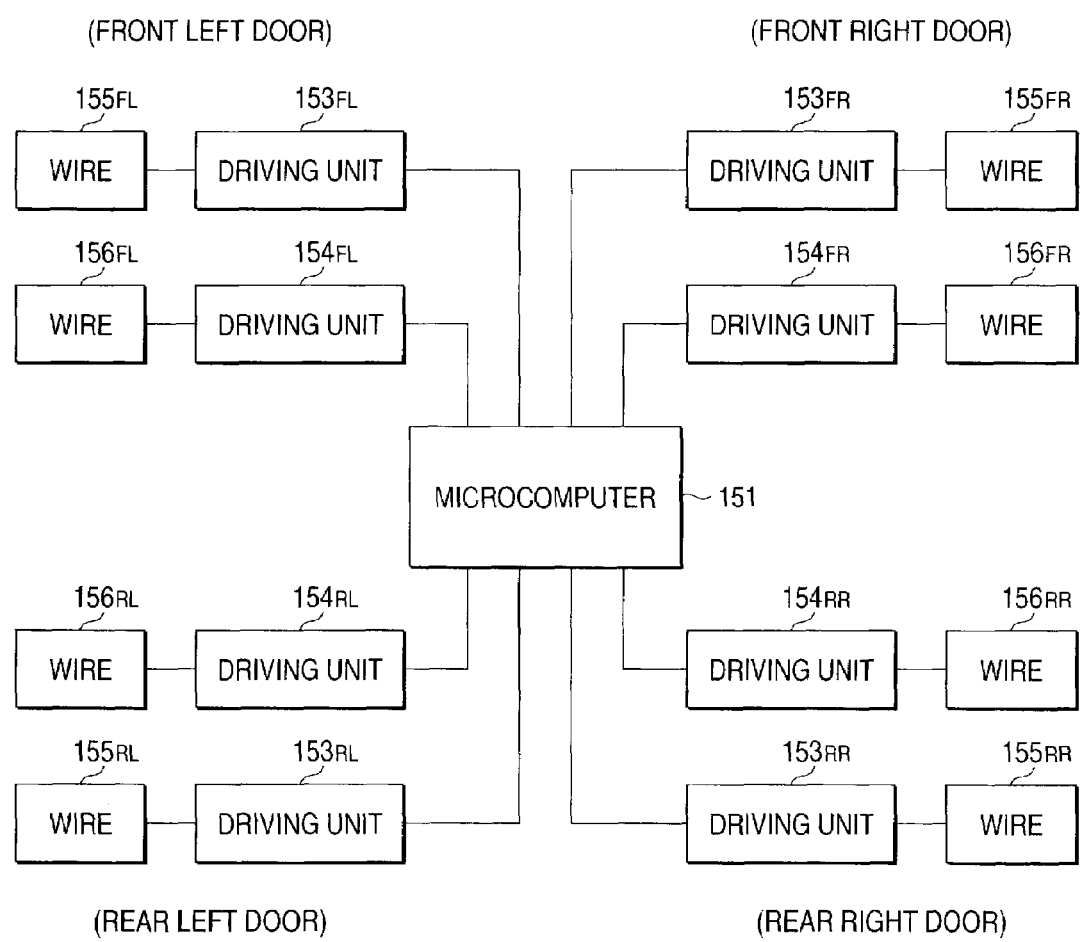
FIG. 27 is a view showing relationships among the microcomputer, the driving units, and the wires in the antitheft apparatus according to the embodiment (12).

Also, as shown in FIG. 27, the capturing system 152 includes first-stage wires $155_{FR}$, ..., which are wound round window frames of four doors (front right door, front left door, rear right door, rear left door), respectively, driving units $153_{FR}$, ..., which wind the wires $155_{FR}$, ..., respectively, second-stage wires $156_{FR}$, ..., which are used at a different time from the first-stage wires $155_{FR}$, ..., and driving units $154_{FR}$, ..., which wind the wires $156_{FR}$, ..., respectively. In this case, the wires 155, 156 are wound round respective window frames in such a manner that each of the wires cannot be wound unless each window glass is broken.

Next, a processing operation (12) executed by the microcomputer 151 in the antitheft system, which employs the antitheft apparatus according to the embodiment (12), will be explained with reference to a flowchart shown in FIG. 28. First, it is decided whether or not the flag $f_{11}$ indicating that the window glass is broken is set to 1 (step T21). Then, if it is decided that the flag $f_{11}$ is not set to 1 (i.e., the window glass is not broken), it is decided whether or not the arming mode is being set (step T22).

Here, if it is decided that the arming mode is being set, it is decided based on the signal supplied from the breakage sensor 127 whether or not the window glass is broken (step T23). If it is decided that the window glass is broken, the flag $f_{11}$ is set to 1 (step T24). Then, it is decided based on the signal supplied from the intrusion sensor 128 whether or not the invalid intrusion into the vehicle is detected (i.e., the hand or the like has entered through the window whose window glass is broken) (step T25).

Then, if it is decided that the hand or the like has entered through the window whose window glass is broken, the driving units $153_{FR}$, ... are controlled so that the first-stage wires $155_{FR}$, ..., which are arranged round the window frames, are wound to catch the entering hand, etc. (step T26). Then, the flag $f_{11}$ is reset to 0 (step T27). Then, the timer t is started (step T28).

Then, it is decided by the timer t whether or not a lapsed time is in excess of a predetermined time $t_{11}$ (e.g., 3 second), i.e., the predetermined time $t_{11}$ has lapsed after the winding of the first-stage wires $155_{FR}$, ... (step T29). If it is decided that the predetermined time $t_{11}$ has lapsed, the driving units $154_{FR}$, ... are controlled so that the second-stage wires $156_{FR}$, ... are wound (step T30). On the contrary, if it is decided that the predetermined time $t_{11}$ has not lapsed, the process goes back to step T29.

Also, if it is decided in step T22 that the arming mode is not being set, or if it is decided in step T23 that the window glass is not broken, or it is decided in step T25 that the hand, or the like has not entered into the vehicle, the processing operation (12) is ended.

Also, if it is decided in step T21 that the flag $f_{11}$ is set to 1, the breakage of the window glass has already been sensed. Thus, steps T22 to T24 are skipped and the process goes to step T25.

According to the antitheft system, which employs the antitheft apparatus according to the above embodiment (12), if the hand or the like enters through the window whose window glass is broken, the body of the intruder such as the entering hand can be captured by using the capturing system 152. Therefore, the antitheft system, which is improved in security performance, can be implemented.

As a result, if a person who is going to commit the vehicle robbery (i.e., the intruder) breaks the window glass, then inserts the hand through the window whose door window glass is broken, and then tries to release the door lock, for example, the intruder can be bound by capturing the hand inserted through the window.

Also, according to the antitheft system, which employs the antitheft apparatus according to the above embodiment (12), the second-stage wires 156 are wound after the predetermined time $t_{11}$ has lapsed from the winding of the first-stage wires 155. Therefore, even if winding the first-stage wires 155 could not capture the intruder, the capture of the intruder is tried once again by using the second-stage wires 156. Therefore, the capture of the intruder can be made surer.

In this case, in the antitheft system that employs the antitheft apparatus according to the above embodiment (11) or (12), two sets of devices for capturing the intruder are provided to the window, respectively. However, in another antitheft system, the capture of the intruder maybe tried three times or more by providing three sets or more of devices.

Further, in the antitheft system that employs the antitheft apparatus according to any one of the above embodiments (10) to (12), if it is detected that the window glass is broken and also the hand or the like has entered into the vehicle, the driving units 130 (143, 153) of the capturing system 129 (142, 152) is controlled to winds the wire arranged round the window frames to capture a part of the body of the intruder such as the entering hand. However, like an antitheft system, which employs the antitheft apparatus according to an embodiment (13) described in the following, the intruder may be captured by winding the wire after a predetermined time $t_{12}$ (e.g., a time required until a person who is going to commit the vehicle robbery inserts his or her hand through the window whose window glass is broken after he or she broke the window glass) has lapsed.

Figure 29:
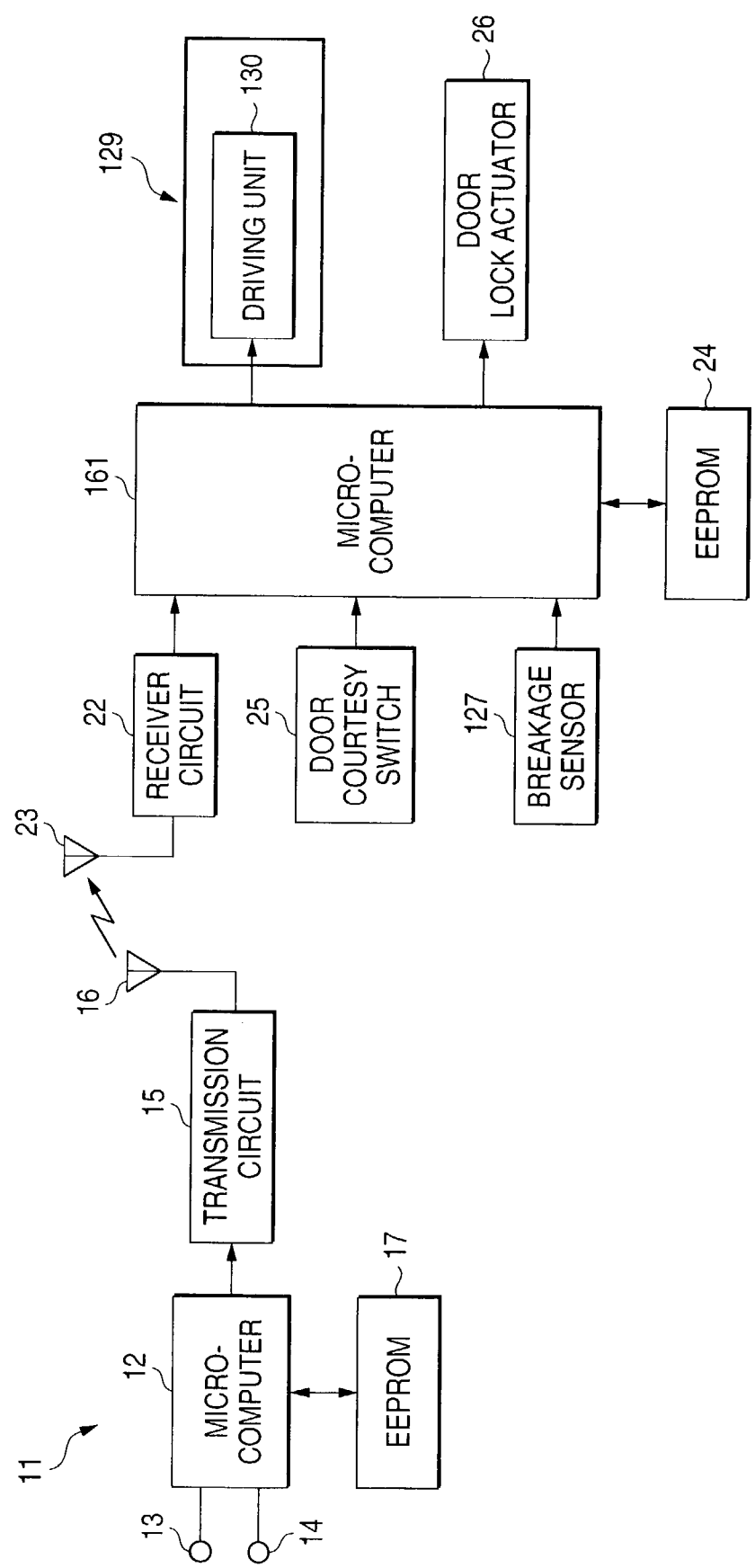
FIG. 29 is a block diagram showing schematically main portions of an antitheft system, which employs an antitheft apparatus according to an embodiment (13) of the invention.

FIG. 29 is a block diagram showing schematically main portions of an antitheft system, which employs an antitheft apparatus according to an embodiment (13) of the invention. In this case, same numerals are allotted to constituent portions similar to those of the antitheft system shown in FIG. 20, and thus their explanation will be omitted herein.

A microcomputer 161 constituting a main body of the antitheft system decides whether or not the ID code contained in the signal (the ID code+the door lock command code), which is received via the antenna 23 and the receiver circuit 22, coincides with the ID code stored in the EEPROM 24. If they coincide with each other, the microcomputer 161 performs a process in response to the door lock command code contained in the above signal and the signal supplied from the door courtesy switch 25, which detects the open/close state of the door.

Also, in case that the arming mode is being set, the microcomputer 161 receives the signal supplied from the breakage sensor 127, which detects the fact that the window glass is broken. Then, the microcomputer 161 controls, based on the received signal, the driving unit 130 of the capturing system 129, which winds wires arranged round window frames to capture a part of a body of an intruder such as a hand of the intruder, which is inserted through the window whose window glass is broken.

Next, a processing operation (13) executed by the microcomputer 161 in the antitheft system, which employs the antitheft apparatus according to the embodiment (13), will be explained with reference to a flowchart shown in FIG. 30. First, it is decided whether or not the flag $f_{11}$ indicating that the window glass is broken is set to 1 (step T31). Then, if it is decided that the flag $f_{11}$ is not set to 1 (i.e., the window glass is not broken), it is decided whether or not the arming mode is being set (step T32).

Here, if it is decided that the arming mode is being set, it is decided based on the signal supplied from the breakage sensor 127 whether or not the window glass is broken (step T33) If it is decided that the window glass is broken, the flag $f_{11}$ is set to 1 (step T34). Then, the timer t is started (step T35)

Then, it is decided by the timer t whether or not a lapsed time is in excess of a predetermined time $t_{12}$ (e.g., a time required until a person who is going to commit the vehicle robbery inserts his or her hand through the window whose window glass is broken after he or she broke the window glass) (i.e., whether or not the predetermined time $t_{12}$ has lapsed after the window glass was broken) (step T36). If it is decided that the predetermined time $t_{12}$ has lapsed, the driving units $130_{FR}$, . . . are controlled so that the wires $156_{FR}$, . . . that are arranged round the window frames, respectively, are wound to catch the hand or the like that is inserted through the window whose window glass is broken (step T37). Then, the flag $f_{11}$ is reset to 0 (step T38). In contrast, if it is decided that the predetermined time $t_{12}$ has not lapsed, the processing operation (13) is ended.

Also, if it is decided in step T32 that the arming mode is not being set, or if it is decided in step T33 that the window glass is not broken, the processing operation (13) is ended as they are.

Also, if it is decided in step T31 that the flag $f_{11}$ is set to 1, the breakage of the window glass has already been detected and the timer t has already been started. Thus, steps T32 to T35 are skipped and the process goes to step T36.

According to the antitheft system, which employs the antitheft apparatus according to the above embodiment (13), if the predetermined time $t_{12}$ (e.g., a time required until the person who is going to commit the vehicle robbery inserts his or her hand through the window whose window glass is broken after he or she broke the window glass) has lapsed after the window glass is broken, the body of the intruder can be captured by using the capturing system 129. Therefore, the antitheft system, which is improved in security performance, can be implemented.

Accordingly, if a person who is going to commit the vehicle robbery (i.e., an intruder) breaks the window glass, then inserts the hand through the window whose door window glass is broken, and then tries to release the door lock, for example, the intruder can be bound by capturing the hand that is inserted through the window.

Also, according to the antitheft system, whicht employs the antitheft apparatus according to any one of the above embodiments (10) to (12), the signal supplied from the intrusion sensor 128 disposed in the vehicle must be acquired in order to work normally the security operation. In this case, there is such a possibility that such sensor is destroyed by the intruder who has the skilled technique.

Thus, if the sensor is destroyed before the intrusion into the vehicle is detected, the capturing system 129 (142, 152) cannot be driven. As a result, such a problem is caused that the intruder cannot be restricted.

However, in the antitheft system according to the above embodiment (13), as shown in FIG. 29, since the signal supplied from the intrusion sensor 128 is not required, occurrence of the above problem can be avoided.

In this case, in the antitheft system, which employs the antitheft apparatus according to any one of the above embodiments (10) to (13), the judgment to decide whether or not the window glass is broken and the judgment to decide whether or not the invalid intrusion is conducted are not executed every window. However, in another antitheft system, a device (e.g., wire), which is set to a corresponding window to capture an intruder, may be driven by executing these decisions every window.

Figure 2:
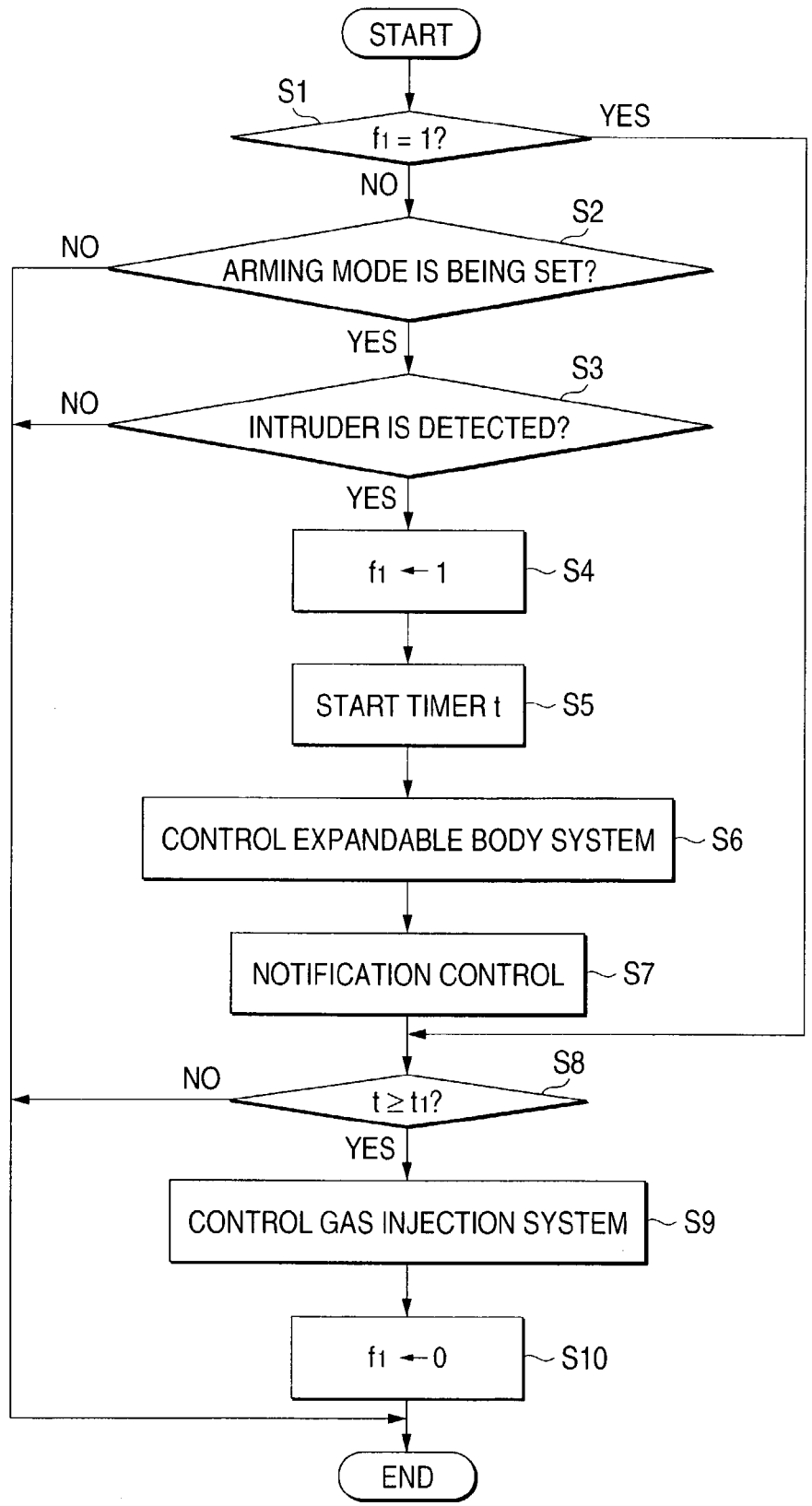
FIG. 2 is a flowchart showing processing operations executed by a microcomputer in the antitheft system, which utilizes the antitheft apparatus according to the embodiment (1).

FIG. 1:
12 microcomputer
15 transmission circuit
21 microcomputer
22 receiver circuit
25 door courtesy switch
26 door lock actuator
27 intruder sensor
28 driving unit
29 driving unit FIG. 2:
S2 the arming mode is being set ?
S3 intruder is detected ?
S5 start timer t
S6 control expandable body system
S7 notification control
S9 control gas injection system FIG. 3:
12 microcomputer
15 transmission circuit
22 receiver circuit
25 door courtesy switch
26 door lock actuator
28 driving unit
29 driving unit
31 microcomputer
32 person approaching sensor
33 warning unit FIG. 4:
S23 person who comes close to vehicle is detected ?
S24 arming mode is being set ?
S26 start timer t
S27 control warning unit
S30 control expandable body system
S31 notification control
S33 control gas injection system
S35 person coming close to vehicle leaves vehicle ?

Figure 6:
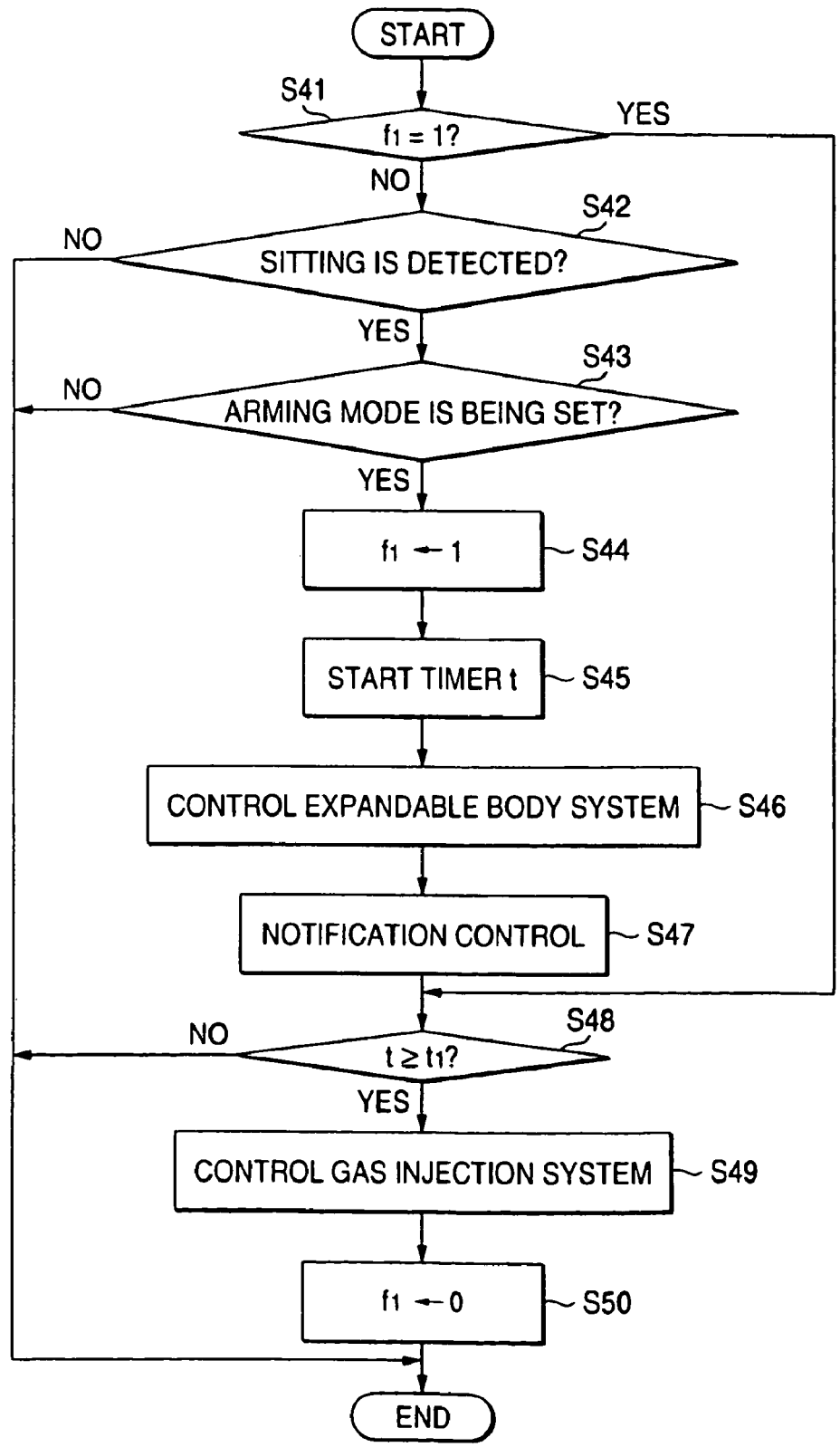
FIG. 6 is a flowchart showing processing operations executed by the microcomputer in the antitheft system, which utilizes the antitheft apparatus according to the embodiment (3).

FIG. 5:
12 microcomputer
15 transmission circuit
22 receiver circuit
25 door courtesy switch
26 door lock actuator
28 driving unit
29 driving unit
34 microcomputer
35 sitting sensor FIG. 6:
S42 sitting is detected ?
S43 arming mode is being set ?
S45 start timer t
S46 control expandable body system
S47 notification control
S49 control gas injection system FIG. 7:
12 microcomputer
15 transmission circuit
22 receiver circuit
25 door courtesy switch
26 door lock actuator
27 intruder sensor
29 driving unit
36 microcomputer FIG. 8:
S51 arming mode is being set ?
S52 intruder is detected ?
S53 control gas injection system
S54 notification control FIG. 9:
12 microcomputer
15 transmission circuit
22 receiver circuit
25 door courtesy switch
26 door lock actuator
29 driving unit
32 person approaching sensor
33 warning unit
37 microcomputer FIG. 10:
S62 person who comes close to vehicle is detected ?
S63 arming mode is being set ?
S65 start timer t
S66 control warning unit
S68 control gas injection system
S69 notification control
S71 person coming close to vehicle leaves vehicle ?

Figure 12:
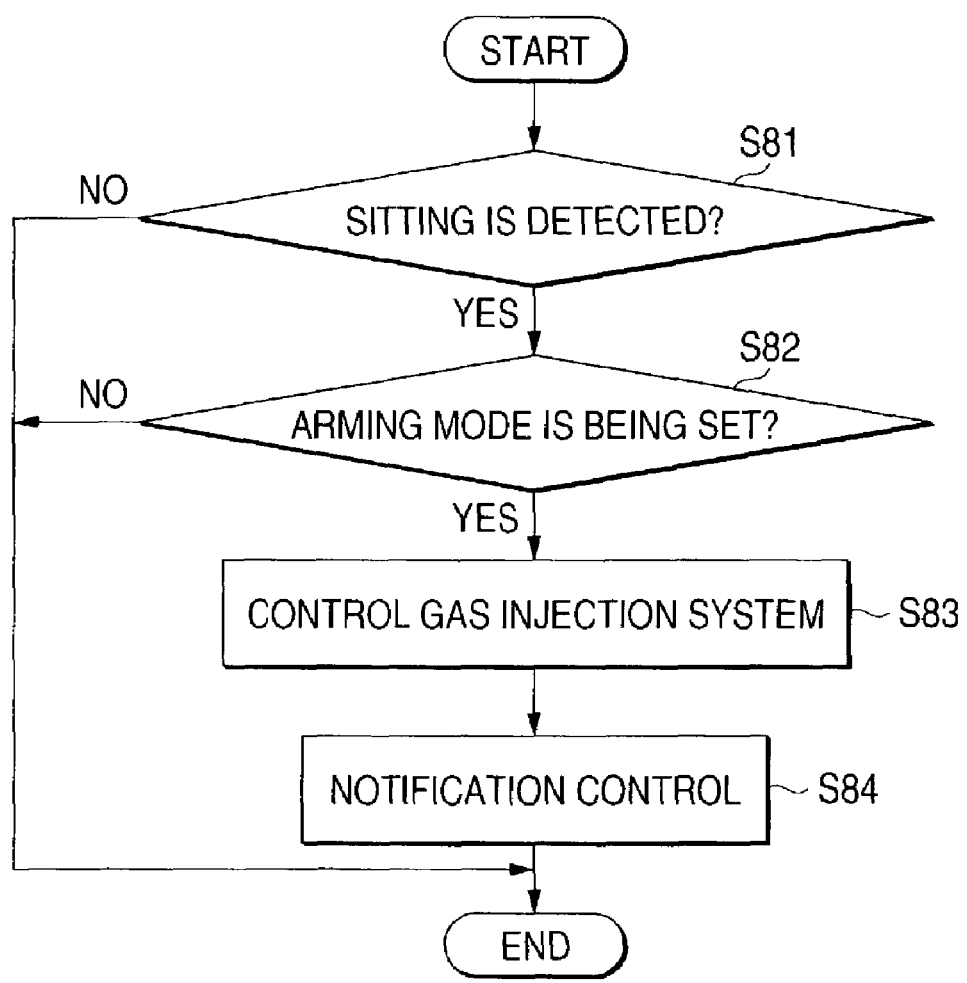
FIG. 12 is a flowchart showing processing operations executed by the microcomputer in the antitheft system, which utilizes the antitheft apparatus according to the embodiment (6).

FIG. 11:
12 microcomputer
15 transmission circuit
22 receiver circuit
25 door courtesy switch
26 door lock actuator
29 driving unit
35 sitting sensor
38 microcomputer FIG. 12:
S81 sitting is detected ?
S82 arming mode is being set ?
S83 control gas injection system
S84 notification control FIG. 13:
12 microcomputer
15 transmission circuit
22 receiver circuit
25 door courtesy switch
26 door lock actuator
27 intruder sensor
29 driving unit
39 microcomputer
40 seat-position adjusting unit 41 reclining adjusting unit
42 tilt/telescopic adjusting unit FIG. 14:
S92 arming mode is being set ?
S93 intruder is detected ?
S95 start timer t
S96 control to move seat forward
S97 control to incline back of seat forward
S98 control to tilt steering wheel downward
S99 control to move steering wheel backward
S100 notification control
S102 control gas injection system FIG. 16:
12 microcomputer
15 transmission circuit
22 receiver circuit
25 door courtesy switch
26 door lock actuator
29 driving unit
40 seat-position adjusting unit
41 reclining adjusting unit
42 tilt/telescopic adjusting unit
43 microcomputer FIG. 17:
S113 person who comes close to vehicle is detected ?
S114 arming mode is being set ?
S116 start timer t
S117 control warning unit
S120 control to move seat forward
S121 control to incline back of seat forward
S122 control to tilt steering wheel downward
S123 control to move steering wheel backward
S124 notification control
S126 control gas injection system
S128 person coming close to vehicle leaves vehicle ?

Figure 19:
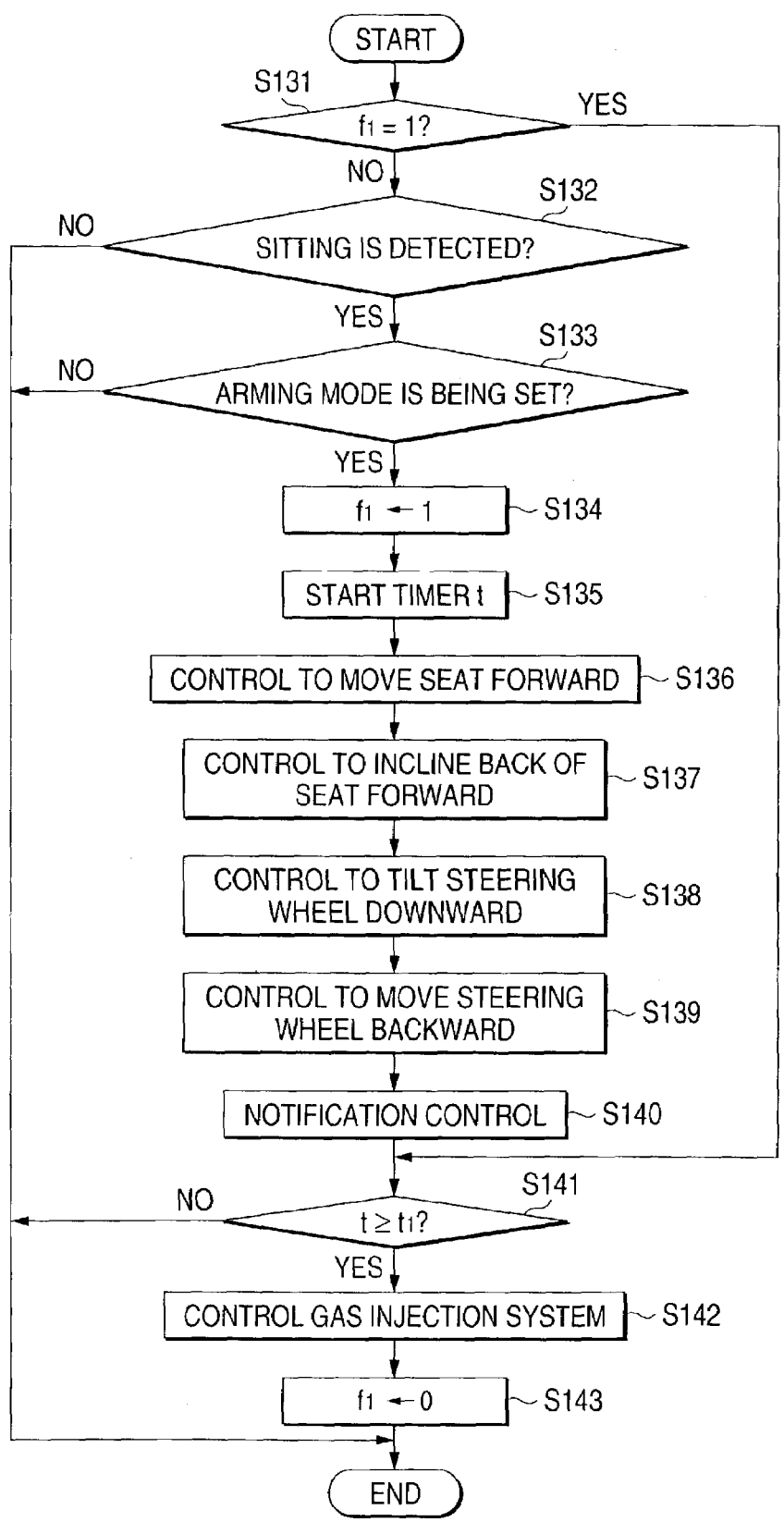
FIG. 19 is a flowchart showing processing operations executed by the microcomputer in the antitheft system, which utilizes the antitheft apparatus according to the embodiment (9).

FIG. 18:
12 microcomputer
15 transmission circuit
22 receiver circuit
25 door courtesy switch
26 door lock actuator
29 driving unit
35 sitting sensor
40 seat-position adjusting unit
41 reclining adjusting unit
42 tilt/telescopic adjusting unit
44 microcomputer FIG. 19:
S132 sitting is detected ?
S133 arming mode is being set ?
S135 start timer t
S136 control to move seat forward
S137 control to incline back of seat forward
S138 control to tilt steering wheel downward
S139 control to move steering wheel backward
S140 notification control
S142 control gas injection system FIG. 20:
12 microcomputer
15 transmission circuit
22 receiver circuit
25 door courtesy switch
26 door lock actuator
121 microcomputer
127 breakage sensor
128 intrusion sensor
130 driving unit FIG. 21:
121 microcomputer
$130_{FL}$, $130_{FR}$, $130_{RL}$, $130_{RR}$ driving unit
$131_{FL}$, $131_{FR}$, $131_{RL}$, $131_{RR}$ wire FIG. 22:
T2 arming mode is being set ?
T3 breakage of glass is detected ?
T5 intrusion is detected ?
T6 drive control FIG. 23:
12 microcomputer
15 transmission circuit
22 receiver circuit
25 door courtesy switch
26 door lock actuator
127 breakage sensor
128 intrusion sensor
141 microcomputer
143 driving unit
144 driving unit FIG. 24:
141 microcomputer
$143_{FL}$, $143_{FR}$, $143_{RL}$, $143_{RR}$, $144_{FL}$, $144_{FR}$, $144_{RL}$, $144_{RR}$ driving unit
$145_{FL}$, $145_{FR}$, $145_{RL}$, $145_{RR}$, $146_{FL}$, $146_{FR}$, $146_{RL}$, $146_{RR}$ wire FIG. 25:
T12 arming mode is being set ?
T13 breakage of glass is detected ?
T15 intrusion is detected ?
T16 drive control (first stage)
T18 capture is executed successfully ?
T19 drive control (second stage)

Figure 28:
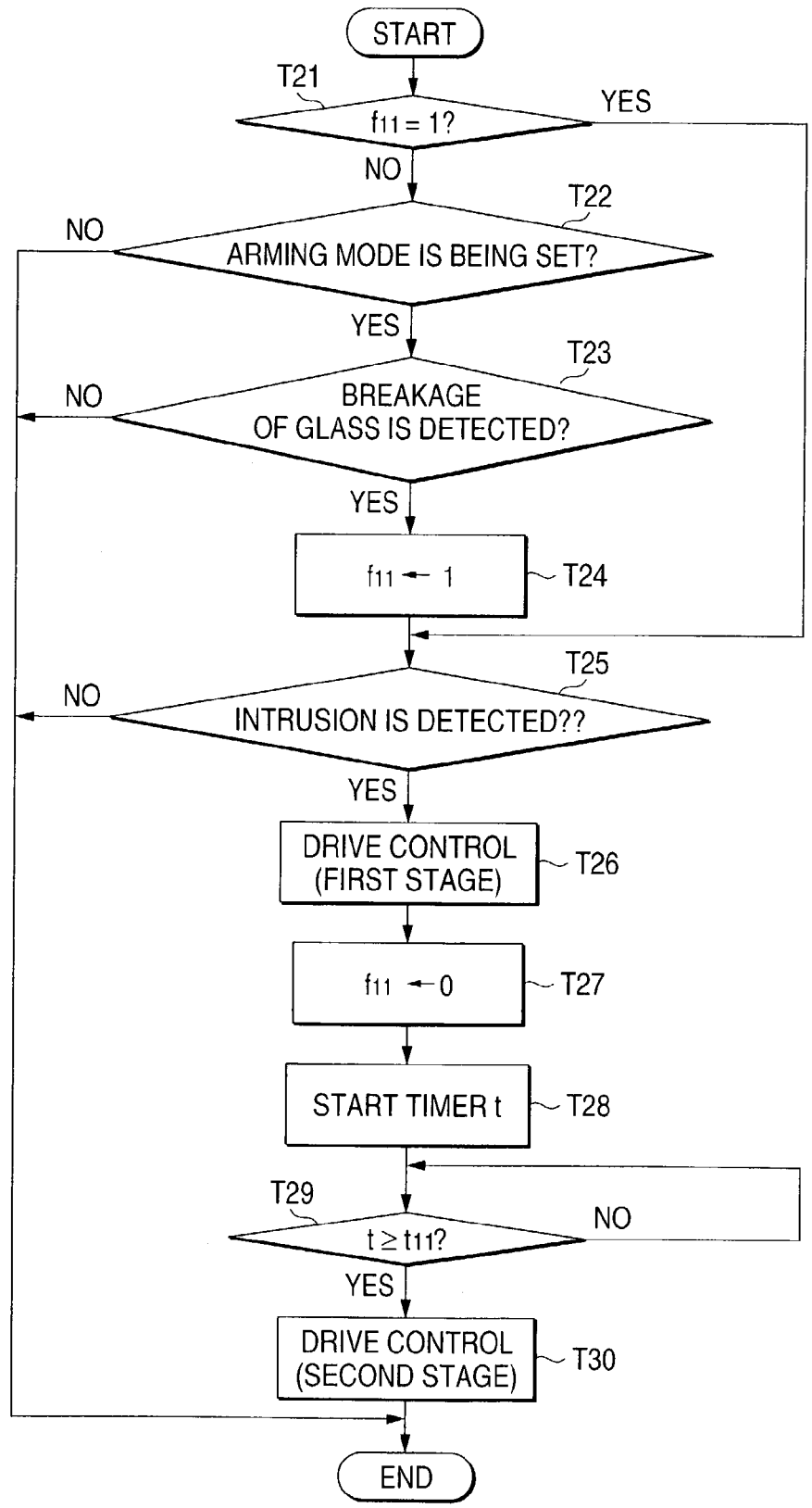
FIG. 28 is a flowchart showing processing operations executed by the microcomputer in the antitheft system, which employs the antitheft apparatus according to the embodiment (12).

FIG. 26:
12 microcomputer
15 transmission circuit
22 receiver circuit
25 door courtesy switch
26 door lock actuator
127 breakage sensor
128 intrusion sensor
151 microcomputer
153 driving unit
154 driving unit FIG. 27:
151 microcomputer
$153_{FL}$, $153_{FR}$, $153_{RL}$, $153_{RR}$, $154_{FL}$, $154_{FR}$, $154_{RL}$, $154_{RR}$ driving unit
$155_{FL}$, $155_{FR}$, $155_{RL}$, $155_{RR}$, $156_{FL}$, $156_{FR}$, $156_{RL}$, $156_{RR}$ wire FIG. 28:
T22 arming mode is being set ?
T23 breakage of glass is detected ?
T25 intrusion is detected ?
T26 drive control (first stage)
T28 start timer t
T29 drive control (second stage)

Figure 30:
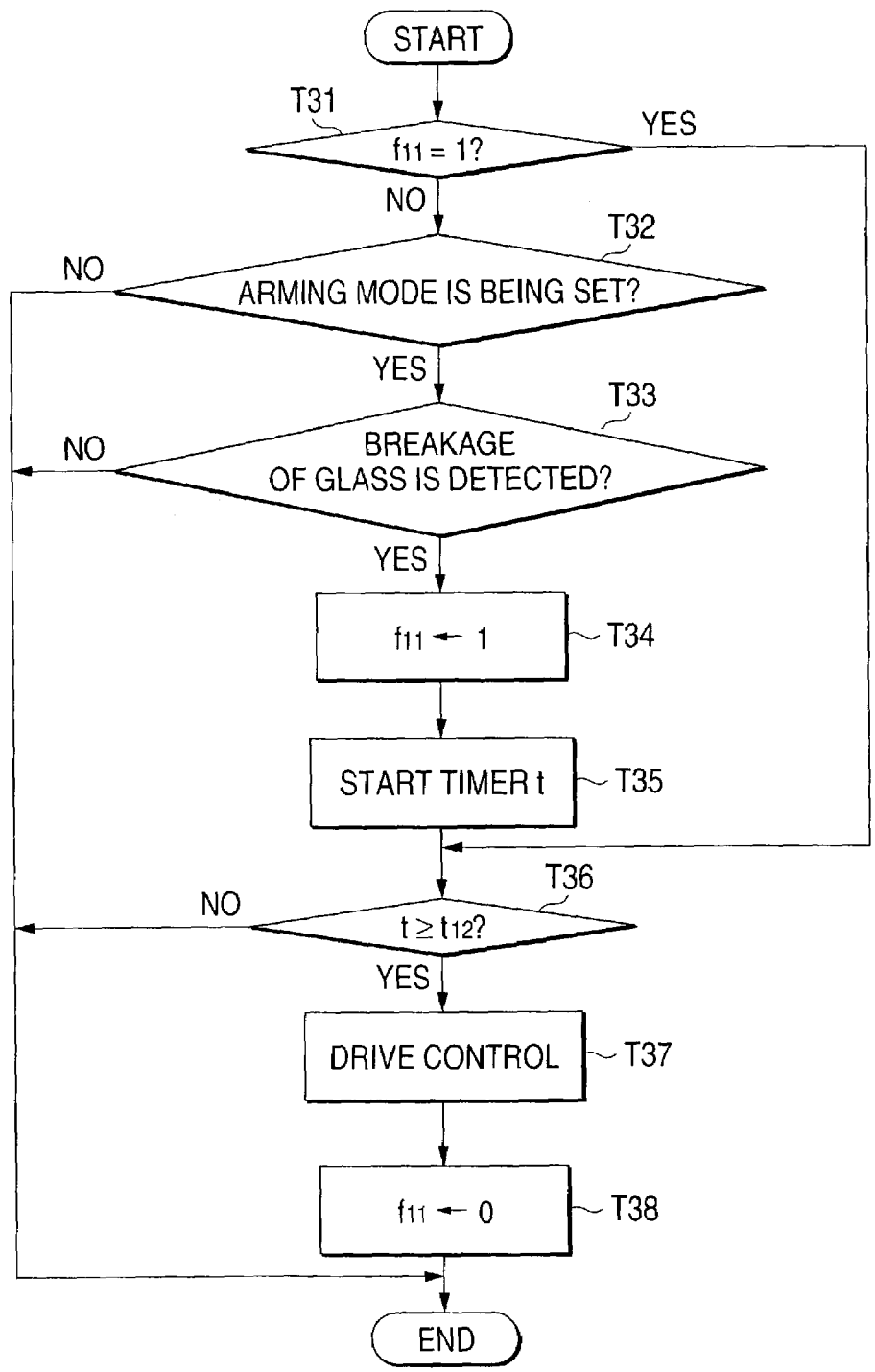
FIG. 30 is a flowchart showing processing operations executed by the microcomputer in the antitheft system, which employs the antitheft apparatus according to the embodiment (13).

FIG. 29:
12 microcomputer
15 transmission circuit
22 receiver circuit
25 door courtesy switch
26 door lock actuator
127 breakage sensor
130 driving unit
161 microcomputer FIG. 30:
T31 arming mode is being set ?
T33 breakage of glass is detected ?
T35 start timer t
T37 drive control

What is claimed is:

1. An antitheft apparatus installed in a vehicle, comprising:
a gas injection system, which injects one of steam and cold air in a predetermined space in the vehicle;
an intruder detection unit for detecting an intruder into the vehicle; and
a controlling unit for controlling a driving unit of the gas injection system to inject the one of steam and cold air when the intruder detection unit detects that an intruder is present in the vehicle.

2. The antitheft apparatus according to claim 1,
wherein the intruder detection unit detects whether or not a person sits on a seat of the vehicle; and
wherein the controlling unit controls the driving unit of the gas injection system to inject the one of steam and cold air when a first condition is satisfied and the intruder detection unit detects the person sitting on the seat.

3. The antitheft apparatus according to claim 1,
wherein the controlling unit controls the driving unit of the gas injection system to inject the one of steam and cold air into the vehicle when a second condition is satisfied, and
wherein the controlling unit is connected to the driving unit of the gas injection system.

4. The antitheft apparatus according to claim 1, further comprising:
a notification unit for notifying an external unit,
wherein the controlling unit controls the notification unit to notify the external unit when the intruder detection unit detects that an intruder is present in the vehicle, and
wherein the controlling unit is connected to the notification unit.

5. The antitheft apparatus according to claim 1, further comprising:
a foam ejection system, which ejects a material serving as a source of foam polystyrene in the predetermined space in the vehicle,
wherein when the intruder detection unit detects that an intruder is present in the vehicle, the controlling unit controls a foam driving unit of the foam ejection system to eject the material and then controls the driving unit of the gas injection system to inject steam as the one of steam and cold air.

6. An antitheft apparatus installed in a vehicle, comprising:
a gas injection system, which injects one of steam and cold air in a predetermined space in a vehicle;
a pre-intrusion detection unit for detecting a person who is going to intrude into the vehicle; and
a controlling unit for controlling a driving unit of the gas injection system to inject the one of steam and cold air when a first predetermined time has lapsed after the pre-intrusion detection unit detects the person.

7. The antitheft apparatus according to claim 6, further comprising:
a foam ejection system which ejects a material serving as a source of foam polystyrene in the predetermined space in the vehicle,
wherein the controlling unit controls a foam driving unit of the foam ejection system to eject the material when a second predetermined time has elapsed after the pre-intrusion detection unit detects the person, and
wherein the first predetermined time is longer than the second predetermined time.

8. An antitheft apparatus installed in a vehicle, comprising:
a foam ejection system, including a driving unit that ejects a material serving as a source of foam polystyrene into the vehicle and injects steam into the ejected material in a predetermined space in the vehicle;
an intruder detection unit for detecting an intruder into the vehicle; and
a foam controlling unit for controlling the driving unit of the foam ejection system to eject the material and inject steam therein when the intruder detection unit detects that an intruder is present in the vehicle.

9. An antitheft apparatus installed in a vehicle, comprising:
a seat-state changing system including a driving unit for changing a state of a seat disposed in the vehicle;
an intruder detection unit for detecting an intruder into the vehicle;
a controlling unit for controlling the driving unit of the seat-state changing system to change the seat to a first state to confine a motion of the intruder when the intruder detection unit detects that an intruder is present in the vehicle; and
a gas injection system, which injects one of steam and cold air in a predetermined space in the vehicle,
wherein the controlling unit controls a gas injection driving unit of the gas injection system to inject the one of steam and cold air when the intruder detection unit detects that the intruder is present in the vehicle,
wherein the controlling unit is connected to the driving unit of the gas injection system.

10. The antitheft apparatus according to claim 9, wherein the predetermined space is located around the seat.

11. An antitheft apparatus installed in a vehicle, comprising:
a seat-state changing system including a seat driving unit for changing a state of a seat disposed in the vehicle;
an intruder detection unit for detecting an intruder into the vehicle;
a foam ejection system, which ejects a material serving as a source of foam polystyrene into the vehicle and injects steam into the ejected material; and
a controlling unit to control the seat driving unit of the seat-state changing system to change the seat to a first state to confine a motion of the intruder when the intruder detection unit detects that an intruder is present in the vehicle and to control a foam driving unit of the foam ejection system to eject the material and inject steam therein when the intruder detection unit detects that the intruder is present in the vehicle.

12. An antitheft apparatus installed in a vehicle, comprising:
- a seat-state changing system including a driving unit for changing a state of a seat disposed in the vehicle;
- an intruder detection unit for detecting an intruder into the vehicle;
- a controlling unit for controlling the driving unit of the seat-state changing system to change the seat to a first state to confine a motion of the intruder when the intruder detection unit detects that an intruder is present in the vehicle; and
- a gas injection system including a gas injection driving unit for injecting gas into the vehicle,
- wherein the gas is one of steam and cold air, and wherein when the intruder detection unit detects the intruder in the vehicle, the controlling unit controls the driving unit of the seat-state changing system to change the seat to the first state to confine a motion of the intruder and then controls the gas injection driving unit of the gas injection system to inject the gas into the vehicle.

13. The antitheft apparatus according to claim 12, further comprising:
- a notification unit for notifying an external unit,
- wherein the controlling unit controls the notification unit to notify the external unit when the intruder detection unit detects that the intruder is present in the vehicle, and
- wherein the controlling unit is connected to the notification unit.

* * * * *